(12) United States Patent
Koteshwara

(10) Patent No.: US 10,795,018 B1
(45) Date of Patent: Oct. 6, 2020

(54) PRESENCE DETECTION USING ULTRASONIC SIGNALS

(71) Applicant: Amazon Technologies, Inc., Seattle, WA (US)

(72) Inventor: Krishna Kamath Koteshwara, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/116,364

(22) Filed: Aug. 29, 2018

(51) Int. Cl.
| | |
|---|---|
| G08B 21/00 | (2006.01) |
| G01S 15/04 | (2006.01) |
| G01S 7/527 | (2006.01) |
| G01S 15/58 | (2006.01) |
| H04R 1/40 | (2006.01) |

(52) U.S. Cl.
CPC ............ G01S 15/04 (2013.01); G01S 7/5273 (2013.01); G01S 15/582 (2013.01); H04R 1/406 (2013.01)

(58) Field of Classification Search
CPC ...... G01S 15/04; G01S 7/5273; G01S 15/582; H04R 1/406
USPC .......................................................... 367/93
See application file for complete search history.

(56) References Cited

U.S. PATENT DOCUMENTS

| | | | |
|---|---|---|---|
| 10,267,912 B1* | 4/2019 | Birkenes | G01S 15/523 |
| 2005/0096540 A1* | 5/2005 | Ooshima | A61B 8/0866 600/437 |
| 2008/0048907 A1* | 2/2008 | Matsuura | G01S 3/808 342/147 |
| 2008/0232608 A1* | 9/2008 | Ullmann | G01S 15/04 381/77 |
| 2012/0001875 A1* | 1/2012 | Li | G01S 7/5273 345/177 |
| 2016/0154089 A1* | 6/2016 | Altman | G01S 7/52004 367/124 |
| 2018/0233145 A1* | 8/2018 | Bathiche | G06K 9/00362 |
| 2018/0259613 A1* | 9/2018 | Hirata | G01S 3/808 |
| 2019/0045312 A1* | 2/2019 | Gunawan | G10L 21/0232 |
| 2019/0050061 A1* | 2/2019 | Borstad | G06F 3/038 |

* cited by examiner

Primary Examiner — Mark S Rushing
(74) Attorney, Agent, or Firm — Lee & Hayes, P.C.

(57) ABSTRACT

This disclosure describes presence-detection devices that detect movement of a person in an environment by emitting ultrasonic signals into the environment, and characterizing the change in the frequency, or the Doppler shift, of the reflections of the ultrasonic signals off the person caused by the movement of the person. In addition to detecting movement, and thus presence of a person, the presence-detection devices may include a microphone array to perform techniques for identifying a direction of movement of the person, and also to perform techniques for identifying a number of people that are in the room. Additionally, the techniques described herein include processing audio signals in such a way to allow for the use of on-board loudspeakers to transmit ultrasonic signals at out-of-band frequencies.

20 Claims, 10 Drawing Sheets

```
┌─────────────────────────────────────────────────────────────┐
│ CAUSE A LOUDSPEAKER OF A COMPUTING DEVICE TO EMIT AN        │
│ ULTRASONIC SIGNAL IN AN ENVIRONMENT                         │
│ 802                                                         │
└─────────────────────────────────────────────────────────────┘
                              │
                              ▼
┌─────────────────────────────────────────────────────────────┐
│ RECEIVE A REFLECTED SIGNAL, CORRESPONDING TO THE ULTRASONIC │
│ SIGNAL, AT THE FIRST AND SECOND MICROPHONE, THE REFLECTED   │
│ SIGNAL ORIGINATING AT AN OBJECT IN THE ENVIRONMENT          │
│ 804                                                         │
└─────────────────────────────────────────────────────────────┘
                              │
                              ▼
┌─────────────────────────────────────────────────────────────┐
│ GENERATE, AT LEAST PARTLY USING A FIRST MICROPHONE, FIRST   │
│ AUDIO DATA REPRESENTING THE REFLECTED SIGNAL                │
│ 806                                                         │
└─────────────────────────────────────────────────────────────┘
                              │
                              ▼
┌─────────────────────────────────────────────────────────────┐
│ GENERATE, AT LEAST PARTLY USING A SECOND MICROPHONE, SECOND │
│ AUDIO DATA REPRESENTING THE REFLECTED SIGNAL                │
│ 808                                                         │
└─────────────────────────────────────────────────────────────┘
                              │
                              ▼
┌─────────────────────────────────────────────────────────────┐
│ DETERMINE, BASED AT LEAST IN PART ON THE FIRST AUDIO DATA,  │
│ FIRST FEATURE DATA REPRESENTING FIRST FREQUENCY             │
│ CHARACTERISTICS OF THE REFLECTED SIGNAL                     │
│ 810                                                         │
└─────────────────────────────────────────────────────────────┘
                              │
                              ▼
┌─────────────────────────────────────────────────────────────┐
│ DETERMINE, BASED AT LEAST IN PART ON THE SECOND AUDIO DATA, │
│ SECOND FEATURE DATA REPRESENTING SECOND FREQUENCY           │
│ CHARACTERISTICS OF THE REFLECTED SIGNAL                     │
│ 812                                                         │
└─────────────────────────────────────────────────────────────┘
                              │
                              ▼
┌─────────────────────────────────────────────────────────────┐
│ DETERMINE, BASED AT LEAST IN PART ON THE FIRST FEATURE      │
│ DATA, THAT THE OBJECT IS IN MOTION                          │
│ 814                                                         │
└─────────────────────────────────────────────────────────────┘
                              │
                              ▼
┌─────────────────────────────────────────────────────────────┐
│ DETERMINE, BASED AT LEAST IN PART ON THE FIRST FEATURE DATA │
│ AND THE SECOND FEATURE DATA, A DIRECTION ASSOCIATED WITH    │
│ THE MOTION                                                  │
│ 816                                                         │
└─────────────────────────────────────────────────────────────┘
```

PRESENCE DETECTION USING ULTRASONIC SIGNALS

BACKGROUND

Many devices and technologies exist for detecting the presence of users in different environments, and for different purposes. For instance, motion-sensing lights are used to automate lighting control based on detecting motion, motion-sensing security devices can trigger alarms upon detecting motion, etc. These presence-sensing devices can utilize many different technologies to detect the presence and/or motion of a user in an environment, such as acoustic sensing, passive infrared sensing (PIR) sensing, Wi-Fi Channel Sate Information (CSI) sensing, radio-wave sensing, etc. To perform many of these types of presence sensing techniques, the presence-sensing devices are often equipped with specialized hardware, such as specialized sensors, specialized processors, etc. However, the different types of specialized hardware required by presence-sensing devices to detect presence or motion can be disadvantageous for many reasons, such as the high cost to include in devices, consumption of large amounts of power, emitting large amounts of heat, etc. Additionally, beyond being able to detect motion, existing presence-sensing devices are unable to provide further contextual information about the motion in the environment.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 8 illustrates a flow diagram of another example process for detecting movement of a user in an environment, and also a direction that the user is moving in the environment.

DETAILED DESCRIPTION

Figure 1:
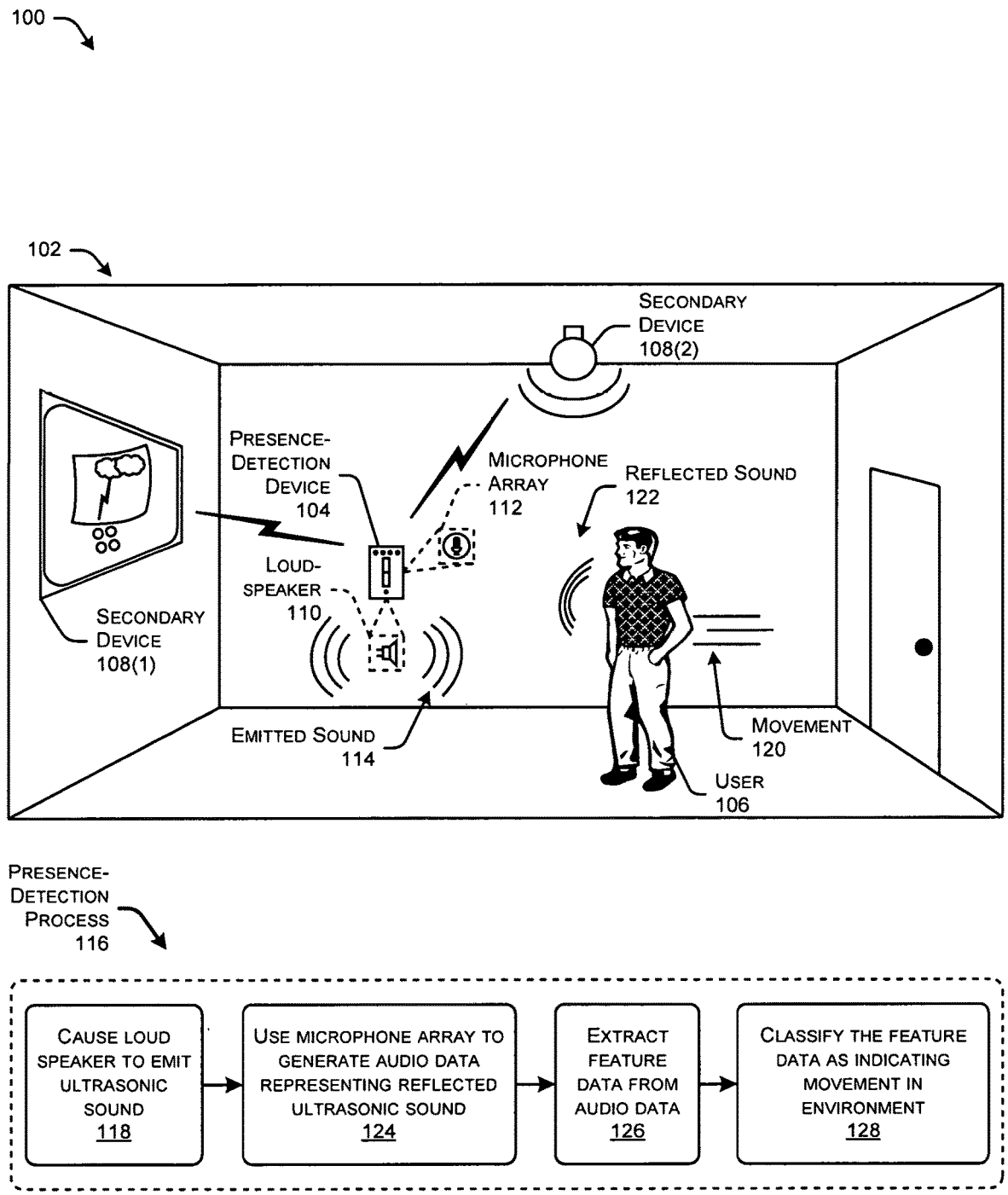
FIG. 1 shows an illustrative presence-detection device interactive architecture set in a home environment. The architecture includes at least one presence-detection device controlling secondary devices physically situated in the home based on detecting presence of a user. In this example, the presence-detection device includes a light switch that has a loudspeaker and a microphone array to detect presence, and/or lack of presence, of a user.

This disclosure describes, in part, presence-detection devices that detect movement of a person in an environment by emitting ultrasonic signals into the environment, and characterizing the change in the frequency, or the Doppler shift, of the reflections of the ultrasonic signals off the person caused by the movement of the person relative to the presence-detection devices. In addition to detecting movement, and thus presence of a person, the presence-detection devices may include a microphone array to further perform techniques for identifying a direction of movement of the person, and also to perform techniques for identifying a number of people that are in the room. Rather than designing or redesigning devices to include expensive, resource-intensive, specialized sensors for detecting motion, such as dedicated ultrasonic transducer, the presence-detection devices described herein may utilize an on-board loudspeaker to emit the ultrasonic signals. However, existing, on-board speakers are often configured to output sound within frequency ranges that are audible to humans (e.g., 35 Hz-20 kHz). To utilize these traditional loudspeakers to transmit ultrasonic signals, the techniques described herein include audio data processing techniques to improve the performance of presence-detection algorithms to accommodate for the loudspeaker transmitting the out-of-band frequencies of the ultrasonic signals (e.g., frequencies above 20 kHz).

In some examples, the presence-detection device may be installed or placed in an environment to monitor a location, such as a room of a house. For instance, the presence-detection device may be a light switch that is installed in a room, a voice-interface device moved into a room to interact with a user through voice, a security-system device to monitor a location, etc. Upon being placed in the room or other environment, and/or periodically, the presence-detection device may undergo a calibration process to determine a more optimized frequency at which to emit the ultrasonic signals in the room. For example, the presence-detection device may use the loudspeaker to emit an ultrasonic calibration signal (e.g., an ultrasonic sweep signal/tone), generate audio data using the microphone array that represents the ultrasonic calibration signal, and analyze that audio data to determine a more optimal frequency range to use for subsequent ultrasonic signal transmissions. For example, the presence-detection device may analyze various frequency bands of a sweep representing the ultrasonic calibration signal, and select the frequency band or range that has the most desirable signal-to-noise (SNR) ratio to emit the ultrasonic calibration signal.

The presence-detection devices may periodically, or continuously, emit ultrasonic signals into the room to determine if a user is present in the room, or depending on the use-case, whether the room is vacant. The presence-detection devices may use the loudspeaker to pulse an ultrasonic signal at the determined frequency, and analyze audio data generate by the microphone array to detect one or more of (i) motion of a person, (ii) a direction of the motion of the person, or (iii) a number of people in the room. In some examples, the algorithms utilized by the presence-detection devices when analyzing the audio data to detect movement are based upon the Doppler Effect. Generally, the Doppler effect (or the Doppler shift) is the change (increase or decrease) in frequency or wavelength of a wave in relation to an object that is moving relative to the wave source. As an illustration, the Doppler effect is responsible for how a siren on an ambulance sounds louder and shriller as it approaches a person, and changes its pitch as soon as the ambulance passes the person.

To detect presence, the presence-detection devices uses the microphone array to generate audio data that represents at least the ultrasonic signal that is emitted into the environment by the loudspeaker. The presence-detection devices may capture audio data for a sufficiently long enough period of time to help ensure that the movement by a person may be detected using the reflection of the ultrasonic signal off the person as they move. Once the audio data is generated, the presence-detection devices may apply high-pass and/or low-pass filters to remove unwanted frequencies, and downsample the audio data to a lower sampling or frequency for baseband processing as the audio data that represents the movement of the user is at a lower frequency range than the transmission frequency range.

In order to analyze the audio data to determine whether the reflection of the ultrasonic signal represented in the audio data indicates movement of a person due to a change in frequency according to the Doppler effect, the presence-detection devices may divide the signal represented in the audio data into its frequency components, or its magnitude and phase components. For instance, the presence-detection devices may utilize one or more algorithms, such as Fast Fourier transform (FFT), to transform the signal represented in the audio data in the time domain into the frequency domain, and represent the frequency of the reflected ultrasonic signal by the magnitude and phase components.

Once the reflected signal is represented by its magnitude and phase components, the presence-detection devices may further utilize a log-transform to transform the magnitude components of the frequency of the reflected signal. For instance, due to the high-dynamic range of the magnitude components of the frequency of the reflected signal, and because the amount of reflection that occurs from movement of the user is relatively small (may appear similar to noise), the log-transform may transform the magnitude components using a log-transforming into a larger range. After applying a log-transform to the magnitude components, the change in magnitude caused by the reflection of the ultrasonic signal off of the moving object, or person, will be more easily identifiable.

In some examples, to determine whether the frequency response of the reflection of the ultrasonic signal indicates a reflection off of a moving object due to the Doppler effect, one or more machine-learning models may be trained and utilized as classifiers to indicate whether movement has been detected in the environment. For instance, a machine-learning model, such as a neural network, may be trained with training data, such as training data that is tagged as no movement (or minor movement), and training data tagged as movement (or major movement such as walking). Generally, the training data may comprise feature vectors of magnitudes of reflections of different ultrasonic signals off of objects over a period of time (e.g., windowing and feature stacking to represent the period of time). In this way, the machine-learning models may be trained to identify input vectors as representing reflections of ultrasonic signals that reflected off a moving object, or that did not reflect off a moving object.

Further, the one or more machine-learning models may additionally be trained to identify the direction of movement of the object through the environment. The microphone array may include multiple microphones that are orientated in different directions and that generate, or otherwise are used to create, multi-channel feature data for frequency components of the reflection of the ultrasonic signal, such as phase components. The machine-learning model(s) may be trained using feature vectors that represent the phase components, or the feature vectors/feature data representing the phase components, from multiple microphones, or multiple of the multi-channel feature data sources. For instance, the machine-learning model(s) may be trained to identify, based on a comparison between phase components representing the reflection of the ultrasonic signal detected by two different microphones, a direction of the object as it moves through the environment. As an example, a first microphone may capture audio data representing a reflection of an ultrasonic signal for 8 seconds of time, and a second microphone that is oriented in a different direction may capture audio data representing the reflection of the ultrasonic signal for substantially the same 8 seconds of time. Feature vectors may be created for each of those audio channel sources that represent the phase of the frequency response of the reflection of the ultrasonic signal. The machine-learning model(s) may be trained to determine, based on a comparison (e.g., subtraction) of the feature vectors representing phase components, a direction of movement of the object as it moves during those 8 seconds. In this way, two (or more) microphones in a microphone array may be utilized to determine the direction the object is moving in the environment.

In even further examples, the machine-learning models may be trained to determine a number of people in the environment that are moving. As an example, the microphone array in the presence-detection devices may include microphones that are oriented in different directions. For instance, a first microphone may be facing, and/or performing beamforming techniques, to generate audio data representing sound emanating from a 180-degree difference than an orientation at which a second microphone in the array is facing/beamforming to capture sound. The machine-learning models may be trained to determine, based on the feature data, that because each of the microphones are generating audio data which represent movement, and the audio data is being captured with, for example, higher than a threshold SNR value (meaning the object is in the beamforming field for each microphone), then there may be at least two objects moving in the environment.

In some examples, the techniques described herein may include various optimizations. For instance, when the presence-detection devices are playing music audio data, or otherwise outputting audio data in a human-audible frequency range, the presence-detection devices may be configured to determine how to mix the music audio data with the ultrasonic audio data in such a way that saturation is avoided. For instance, the presence-detection devices may analyze the music audio data stored in an audio buffer and determine locations at which to mix the audio data representing the ultrasonic signals in order to avoid saturation of the different audio data. Further details regarding this are described below.

While the techniques described herein may be applied and useful in many scenarios, the presence-detection devices may perform various operations upon detecting movement of a person, detecting a direction of the movement of the person, and/or detecting the number of people in the room. For instance, the presence-detection devices may cause various secondary devices to turn on or off (e.g., lights, television, security alarm, etc.), optimize the output of music data to create auditory "sweet spots" for the person as they move through the room, perform more effective beamforming techniques based on the location and/or movement of the user, and so forth.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 shows an illustrative architecture 100 including a home environment 102 in which a presence-detection device 104 is located in the home environment 102 to detect presence of a user 106. The architecture 100 includes at least one presence-detection device 104 controlling secondary devices 108 (e.g., television 108(1), light 108(2), or any other controllable device) physically situated in the home 102 based on detecting presence of the user 106. In this example, the presence-detection device 104 includes or comprises a light switch that has a loudspeaker 110 and a microphone array 112 to detect presence, and/or lack of presence, of the user 106.

As shown in FIG. 1, the loudspeaker 110 of the presence-detection device 104 may transmit, or otherwise output, an emitted sound 114. Generally, the loudspeaker may comprise any type of electroacoustic transducer that convers an electric audio signal into a corresponding sound. Generally, the loudspeaker 110 may be an existing on-board speaker configured to output sound within frequency ranges that are audible to humans, such as 35 Hz-20 kHz. However, in the illustrated example the emitted sound 114 may include at least a pulsed, or a continuous, emission of sound 114 at a frequency that is outside the frequency range in which humans can hear sound (e.g., over 20 kHz). Thus, the loudspeaker may be emitting sound 114, such as ultrasonic signals, that are traditionally out-of-band for the loudspeaker 110. As illustrated, FIG. 1 may represent a high-level the presence-detection process 116 performed by the presence-detection device 104 in order to detect movement of an object, such as the user 106. At 118, the presence-detection device 104 may cause the loudspeaker 110 to emit the ultrasonic sound (e.g., emitted sound 114) into the home 102. In some examples, the presence-detection device 104 may continuously cause the loudspeaker 110 to emit the ultrasonic sound 114, while in other examples, the ultrasonic sound 114 may be emitted periodically, or pulsed.

Upon being emitted, the sound 114 will generally reflect off of objects in the home 102. As briefly mentioned above, when the emitted sound 114 bounces off objects, various changes to the characteristics of the audio signal may occur. For instance, as mentioned above, the Doppler effect (or Doppler shift) is one such change in audio signal characteristics where the frequency or wavelength of a wave, such as an emitted sound wave 114, changes in relation to an emitting object upon bouncing off of a moving object. In the illustrated example, the emitted sound 114 may experience a change in frequency upon reflecting off the user 106 if the user 106 is moving. Thus, because there is movement 120 user 106, the reflected sound 122 (or reflected signal) may experience a change in frequency. Generally, if the movement 120 of the user 106 is towards the loudspeaker, then the reflected sound 122 may have a higher frequency compared to the emitted sound 114 when detected at the presence-detection device 104. Conversely, the reflected sound 122 may have a lower frequency relative to the presence-detection device 104 compared to the emitted sound 114 when the movement 120 of the user 106 is away from the presence-detection device 104.

At 124, the presence-detection device 104 may use the microphone array 112 to generate audio data representing the reflected ultrasonic sound 122. In some examples, the microphone array 112 may include two or more microphones arranged on, or in, the presence-detection device 104 in any pattern (e.g., rows of microphones, circular pattern on a surface, offset and/or alternating rows of microphones, etc.). Further, the microphones in the microphone array 112 may be facing, or oriented, in different directions to capture sound from different directions with a better signal-to-noise ratio. Additionally, or alternatively, the presence-detection device 104 may performing acoustic processing on audio data/signals generated by the microphones of the microphone array 112 in order to perform beamforming to perform directional signal/sound reception in the home environment 102. In this way, the microphones in the microphone array 112 may be configured to detect sound from different regions of the home 102 with stronger SNR values. Generally, the microphones of the array 112 may comprise transducers that convert sound (e.g., reflected sound 122) into electrical signals, or audio data.

At 126, the presence-detection device 104 may include one or more components which extract feature data from the audio data. In some examples, each of the microphones in the array 112 may create an audio channel, thus creating a multi-channel flow of audio data. The components may perform various processing on the audio data channels (e.g., filtering, down sampling, Fourier transform(s), log-transform(s), etc.) prior to extracting the feature data. In some examples, the components of the presence-detection device 104 may extract magnitude feature data and phase feature data that represent the frequency of the reflected sound 122 as detected by each microphone of the array 112 for periods of time to determine if movement 120 of the user 106 exists in the home 102.

At 128, the presence-detection device 104 may classify the feature data as indicating movement in the environment 128. For instance, the presence-detection device 104 may include one or more machine-learning models that have been trained to determine whether feature data, such as magnitude feature data and/or phase feature data, indicate that reflected sounds 122 have bounced off of a moving object, such as the user 106. Additionally, as described in more detail below, the components of the presence-detection device 104 may further be configured to determine a direction of the movement 120 of the user 106 based on the phase feature data, and also determine whether multiple users 106 are in the environment 102.

Figure 2A:
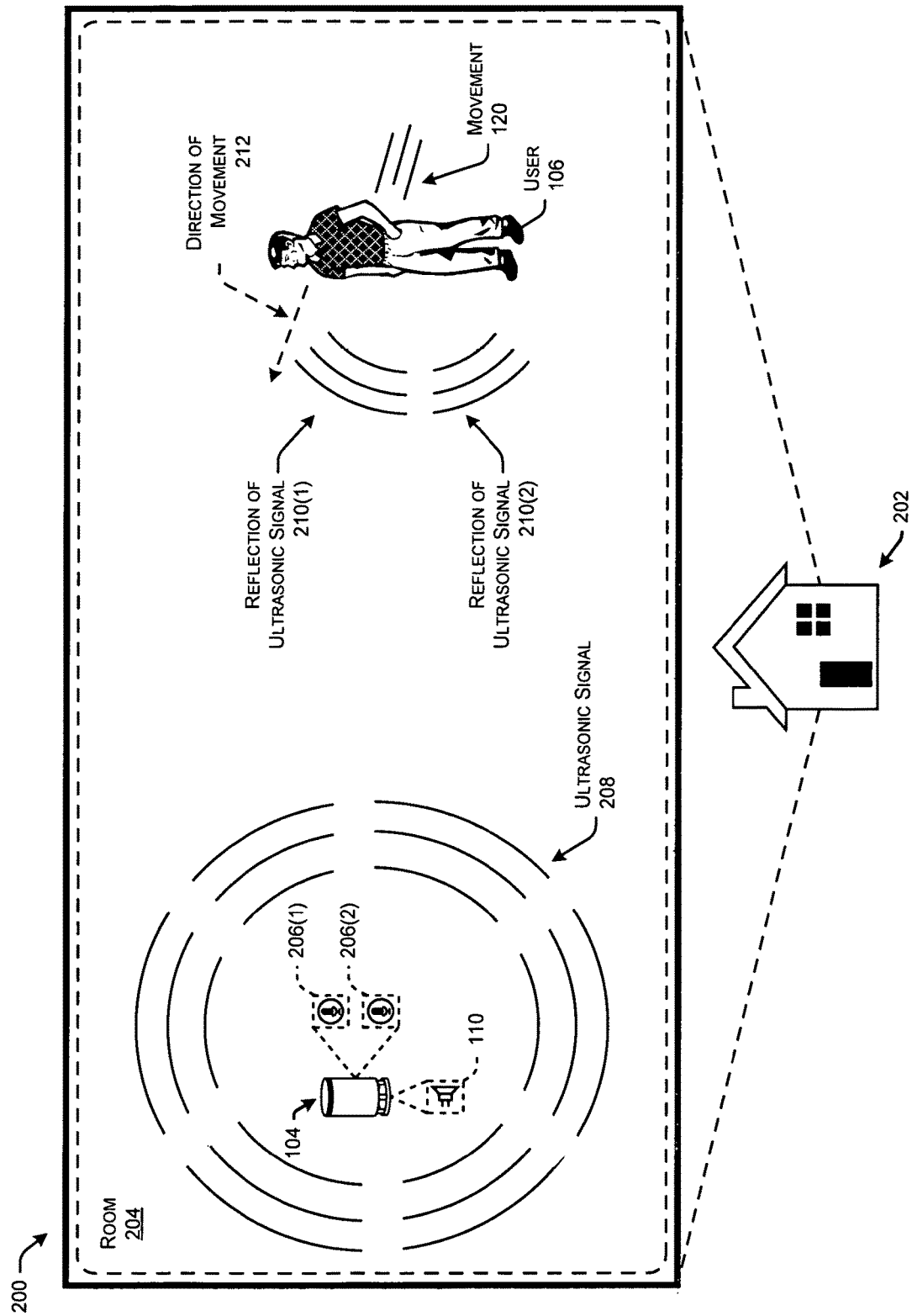
FIG. 2A illustrates an example environment in which a presence-detection device detects presence of a user, as well as a direction of movement of the user as the user moves through the environment.

FIG. 2A illustrates an example environment in which a presence-detection device detects presence of a user, as well as a direction of movement of the user as the user moves through the environment.

As illustrated, the example environment 200 may include a monitored location, such as a home 202, that includes a room 204. The room may include a user 106 and a presence-detection device 104. The presence-detection device 104 may include a loudspeaker 110 and a microphone array 112 including a first microphone 206(1) and a second microphone 206(2). In some examples, the first microphone 206(1) and the second microphone 206(2) may be oriented in different directions, and/or perform beamforming in different directions. The loudspeaker 110 may transmit/emit an ultrasonic signal 208 into the room 204 periodically, or continuously. The ultrasonic signal 208 may bounce off objects in the room 204, such as the user 106. In such examples, the ultrasonic signal 208 may bounce of the user 106 resulting in one or more reflections of the ultrasonic signal 210. In such examples, the first microphone 206(1) may generate audio data representing a first reflection of the ultrasonic signal 210(1), and the second microphone 206(2) may generate audio data representing a second reflection of the ultrasonic signal 210(2).

In some examples, the presence-detection device 104 may extract feature data representing the frequency of the reflections of the ultrasonic signals 210(1) and 210(2) (e.g., magnitude feature data, phase feature data, etc.). The presence-detection device 104 may determine, based on the magnitude feature data of at least one stream of the audio data representing the reflection of the ultrasonic signal 211. As described in more detail below, a classifier of the presence-detection device 104 may determine, based on the magnitude feature data, that the user 106 was moving, or detect movement 120 of the user 106, in the room 204. Further, the classifier of the presence-detection device 104 may determine, based on a comparison (e.g., difference) between phase feature data of the two audio streams, a direction of movement 212 of the user 106 through the room 204. Thus, based on the phase feature data from the multiple audio streams, the presence-detection device 104 may determine the direction of movement 212 that the user 106 is moving through the environment 204.

Figure 2B:
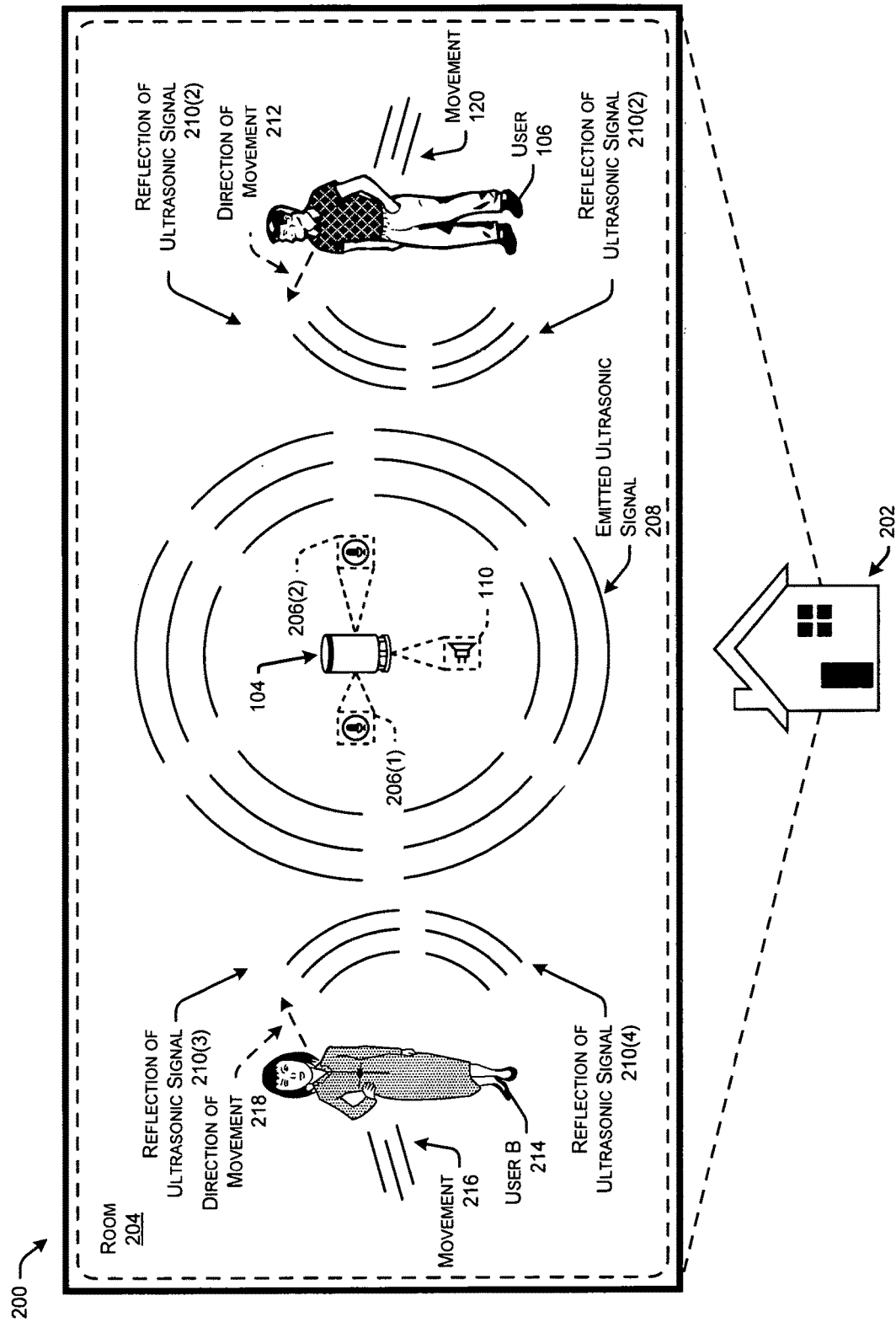
FIG. 2B illustrates another example environment in which a presence-detection device detects the presence of multiple users, and also directions of movement for each of the users.

FIG. 2B illustrates another example environment in which a presence-detection device detects the presence of multiple users, and also directions of movement for each of the users.

Similar to the techniques described in FIG. 2A, the presence-detection device 104 may, in FIG. 2B, utilize the loudspeaker 110 and microphones 206(1) and 206(2) to detect the user 106 moving, and also a direction of movement 212.

In some examples, the presence-detection device 104 may cause the loud speaker to emit the ultrasonic signal 208 in the room 204. The ultrasonic signal 208 may reflect off objects in the room, such as the user 106, another user B 214, and/or off of other objects such as walls, furniture, etc. In various examples, the microphones 206(1) and 206(2) may each detect or receive reflections of the ultrasonic signal 210(1), 210(2), 210(3), and/or 210(4) that originate or reflect off the users 106 and 214. The presence-detection device 104 may include components configured to determine that two or more users are in the room 204. For example, the presence-detection device 104 may analyze audio data that was generated using the microphones 206(1) and 206(2). Specifically, the presence-detection device 104 may analyze phase components of the audio data to determine if multiple users 106 and 214 are moving in the room 204. As an example, the presence-detection device 104 may analyze the phase components for the audio data representing the reflection of the ultrasonic signals 210 to identify phase components, or phase angles, of the frequency of the reflections of the ultrasonic signals 210. The phase angles may indicate that there is movement at a $\varphi(1)$ of 150 degrees, and also movement at a $\varphi(2)$ of 10 degrees. In such examples, because the movement at the two different phase angles are so far apart, the presence-detection device 104 may determine that a user 106 is moving in the room 204, and also that a user B 214 is moving in the room 204. Thus, the presence-detection device 104 may be configured to utilize the microphones 206 to determine, based on phase angles representing the reflections of the ultrasonic signal 210, movement 216 of user B 214, and also movement 120 of user 106, and determine that multiple users are in the room 204.

Although the microphones 206(1) and 206(2) and loudspeaker 110 are illustrated as being positioned in, or on, the presence-detection device 104 at specific locations or orientations, the microphones 206(1) and 206(2) and loudspeaker 110 may be positioned in, or on, the presence-detection device 104 at any location and according to any orientation. Further, the presence-detection device 104 may include additional microphones 206 and/or loudspeakers 110 than illustrated. In an even further example, the microphones 206 and/or loudspeaker 110 may be positioned separately from the presence-detection device 104, but be communicatively coupled to the presence-detection device 104.

Figure 3:
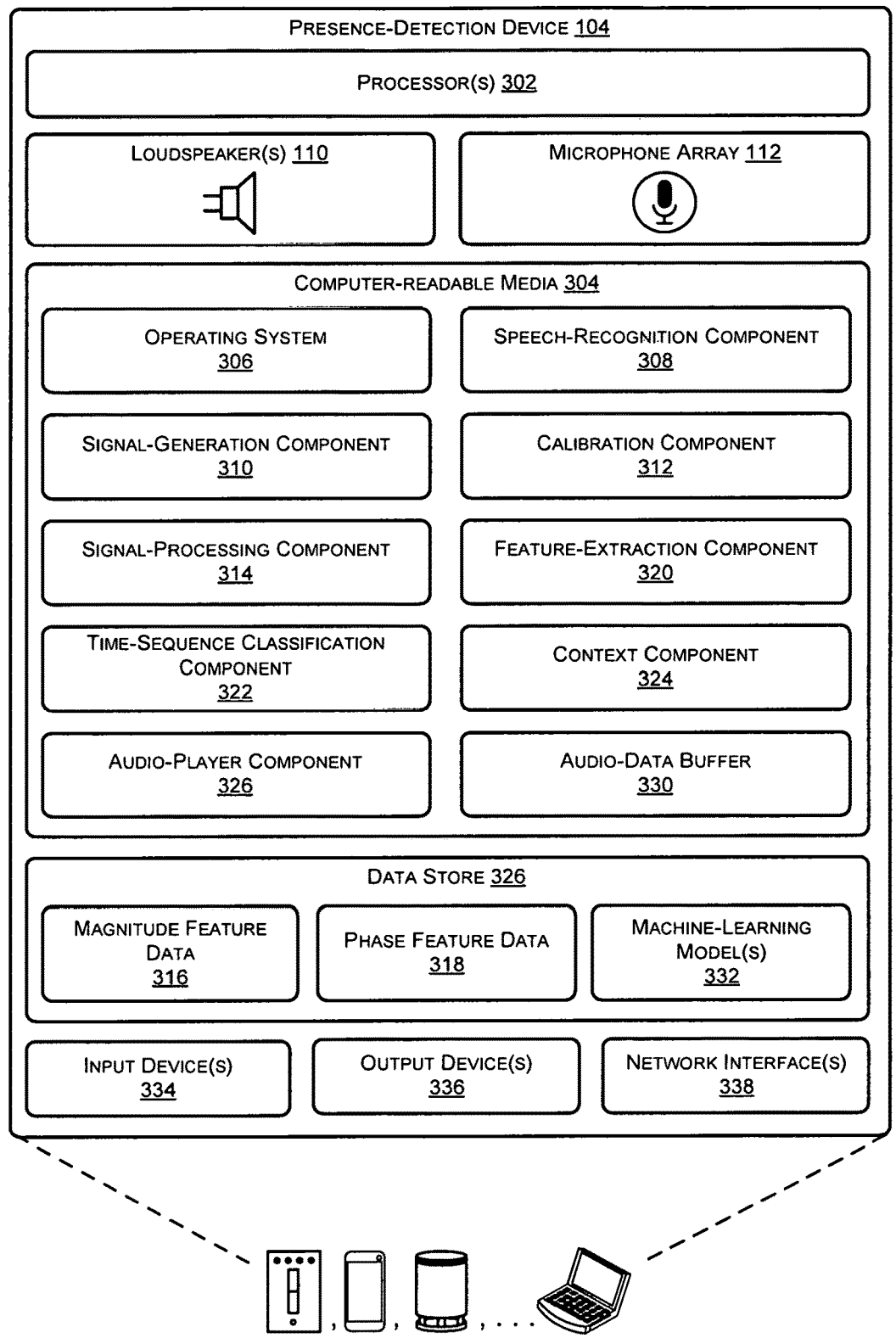
FIG. 3 illustrates an example configuration of components of a presence-detection device.

FIG. 3 illustrates an example configuration of components of a presence-detection device 104. Generally, the presence-detection device 104 may comprise any type of device, such as a fixed computing device (e.g., light switch, appliance, etc.), and/or a portable or mobile device such as voice-controlled devices, smartphones, tablet computers, media players, personal computers, wearable devices, various types of accessories, and so forth.

The presence-detection device 104 may include one or more processors 302 configured to execute various computer-executable instructions stored on the presence-detection device 104. Further, the presence-detection device 104 may include one or more loudspeakers 110 positioned at one or more locations on the presence-detection device 104. The loudspeakers 110 may include one loudspeaker 110, and/or an array of loudspeakers configured to coordinate the output of sound. The loudspeakers 110 may comprise any type of electroacoustic transducer which converts an electronic audio signal (e.g., audio data) into corresponding sound represented by the audio signal. In some examples, the loudspeaker(s) 110 may be simple onboard speakers designed to output sound in frequency ranges that are audible to humans, rather than being specialized ultrasonic transducers. However, in other examples the loudspeaker(s) 110 may be specialized ultrasonic transducers depending on the presence-detection device 104.

The presence-detection device 104 may further include the microphone array 112 that comprises one or more microphones which may include transducers that convert sound into an electrical audio signal. The microphone array 112 may include any number of microphones that are arranged in any pattern. For example, the microphone array 112 may be arranged in a geometric pattern, such as a linear geometric form, circular geometric form, or any other configuration. As an example, an array of four microphones may be placed in a circular pattern at 90-degree increments (e.g., 0, 90, 180, 270) to receive sound from four directions. The microphone array 112 may be in a planar configuration, or positioned apart in a non-planar three-dimensional region. In some implementations, the microphone array 112 may include a spatially disparate array of sensors in data communication. For example, a networked array of sensors may be included. The microphone array 112 may include omnidirectional microphones, directional microphones (e.g., shotgun microphones), and so on.

The presence-detection device 104 may further include computer-readable media 304 that may be used to store any number of software and/or hardware components that are executable by the processor(s) 300. Software components stored in the computer-readable media 304 may include an operating system 306 that is configured to manage hardware and services within and coupled to the presence-detection device 104. The computer-readable media may store a speech-recognition component 308 that, when executed by the processor(s) 302, perform speech-recognition on processed audio signal(s) to identify one or more voice commands represented therein. For instance, the speech-recognition component 308 may convert the audio signals into text data using automatic-speech recognition (ASR), and determine an intent for voice commands of the user 106 using natural-language understanding (NLU) on the text data. Thereafter, a command processor, stored in the computer-readable media 304 (and/or at a remote network-based system), may cause performance of one or more action in response to identifying an intent of the voice command. In the illustrated example, for instance, the command processor may issue an instruction to control a secondary device 108. For instance, the command processor may issue one or more instructions to the television 108(1) to show the weather channel, sends an instruction to dim the light 108(2), and/or output music using a loudspeaker 110.

The computer-readable media 304 may further store a signal-generation component 310 that, when executed by the processor(s) 302 generate audio signals/data that represent sound to be output by the loudspeaker(s) 110. The signal-generation component 310 may, for example, generate audio data representing ultrasonic signals that are output by the loudspeaker(s) 110 at a frequency that is above the audible range of humans. The signal-generation component 310 may generate ultrasonic signals at various power levels depending on, for example, a size of a room that the presence-detection device 104 is in. Further, the signal-generation component 310 may generate ultrasonic signals that are converted into sound by the loudspeaker(s) 110 according to various timing implementations, such as a continuously emitted sound, a pulsed sound, a periodically pulsed sound, etc. In some examples, the signal-generation component 310 may be configured to generate a calibration signal, such as an audio sweep signal, to determine audio characteristics of a room or other environment of the presence-detection device 104.

The computer-readable media 304 may further store a calibration component 312 configured to, when executed by the processor(s) 302, determine audio characteristics of an environment of the presence-detection device 104 and/or frequencies at which to output sound by the loudspeaker(s) 110. In some examples, the calibration component 312 may cause the signal-generation component 310 to generate audio data representing a calibration tone, such as an ultrasonic sweep signal, to determine audio characteristics of the environment of the presence-detection device 104. The calibration component 312 may perform device calibration to determine an optimal frequency range for ultrasonic signals to be emitted by the loudspeaker(s) 110 into the environment. In some examples, the calibration component 312 may cause the signal-generation component 310 to generate an ultrasonic sweep signal that, when converted into sound by the loudspeaker(s) 110, emits a sound over a period of time at a range of ultrasonic frequencies (e.g., 27 kHz-33 kHz). The calibration component 312 may also activate at least one microphone in the microphone array 112 to generate audio data representing the ultrasonic sweep signal, and determine an optimal frequency range/bin for the environment. For instance, the calibration component 312 may analyze various frequency ranges included in the total frequency range of the ultrasonic sweep signal and determine signal-to-noise (SNR) values for one or more frequency ranges. The calibration component 312 may determine which sub-frequency range in the total frequency range of the ultrasonic sweep signal has the best SNR value.

In some examples, the calibration component 312 may cause utilize the ultrasonic sweep signal upon installation of the presence-detection device 104, after detecting movement, or the end of movement, using a sensor of the presence-detection device 104, and/or periodically in order to determine an optimal frequency at which to emit ultrasonic signals into an environment of the presence-detection device 104.

In some examples, the calibration component 312 may perform more passive techniques for determining acoustic characteristics of an environment of the presence-detection device 104. For instance, the calibration component 312 may, at least periodically, simply utilize at least one microphone in the microphone array 112 to generate audio data while the loudspeaker(s) 110 is not outputting sound. The calibration component 312 may analyze that audio data to determine background noise or sound in the environment of the presence-detection device 104. In this way, the calibration component 312 may detect noise that may be caused by other objects in the environment (e.g., television, ceiling fan, vacuum cleaner, etc.) that may interfere with analyzing audio data representing ultrasonic signals. In this way, the calibration component 312 may determine a background noise profile or signature that may later be used to help identify portions of audio data that represent reflections of the ultrasonic signal, rather than background noise. The calibration component 312 may provide an indication of a frequency at which to emit ultrasonic signals to the signal-generation component 310 in order to generate audio data/signals that represent the ultrasonic signals when converted by the loudspeaker(s) 110. In this way, the loudspeaker(s) 110 may emit ultrasonic signals that are at a more optimized frequency range based on audio characteristics of the environment.

The computer-readable media 304 may further include a signal-processing component 314 that, when executed by the processor(s) 302, perform various operations for processing audio data/signals generated by the microphone array 112. For example, the signal-processing component 314 may include components to perform low-pass filtering and/or high-pass filtering to ensure that speech and other sounds in the spectrum region of the ultrasonic signal does not affect baseband processing. For instance, the signal-processing component 314 may performing high-pass filtering for the audio data received in each audio channel for respective microphones in the array 112 to remove sounds at lower frequencies that are outside or lower than of the frequency range of the ultrasonic signal and/or reflected signals that have shifted, such as speech (e.g., 100 Hz, 200 Hz, etc.) or other sounds in the environment. Further, the signal-processing component 314 may perform baseband carrier shifts (e.g., at 96 kHz) to shift or modulate the audio signal back to baseband frequency from the carrier frequency (e.g., 46 kHz, 21 kHz, etc.). Additionally, the signal-processing component 314 may perform low-pass filtering for each audio signal generated by each microphone in the array 112 after the baseband carrier shift to remove signals from the audio signals that are higher than a certain cutoff frequency that is higher than audio signals representing the ultrasonic signal (e.g., a cutoff frequency of than 30 kHz, 33 kHz, 35 kHz, and/or any other cutoff frequency higher than the ultrasonic signal frequency range).

In some examples, the signal-processing component 314 may perform integer down sampling, such as digital sampling, to remove certain samples from the audio signals. For example, the signal-processing component 314 may perform any form of digital down sampling or decimation to reduce the sampling rate of the audio signals, such as down sampling at a rate of 2 kHz (or another appropriate frequency). In this way, the signal-processing component 314 may produce an approximation or representation of the audio signals generated by the microphone array 112, but at a lower frequency rate. After down sampling the audio signals, the signal-processing component 314 may perform various signal processing, such as windowing, Fourier Transformations, and/or logarithmic transformations. For example, the signal-processing component 314 may perform various types of transforms to convert the audio signal from the time domain into the frequency domain, such as a Fourier transform, a fast Fourier transform, a Z transform, a Fourier series, a Hartley transform, and/or any other appropriate transform to represent or resolve audio signals into their magnitude (or amplitude) components and phase components in the frequency domain. Further, the signal-processing component 314 may utilize any type of windowing function on the audio data, such as the Hanning Window, the Hamming Window, Blackman window, etc. Additionally, the signal-processing component 314 may perform a logarithmic transform on the magnitude components to transform the magnitude components of the frequency of the reflected signal. For instance, due to the high-dynamic range of the magnitude components of the frequency of the reflected ultrasonic signal, and because the amount of reflection that occurs from movement of the user 106 is relatively small (may appear similar to noise), the logarithmic transform may transform the magnitude components into a larger range. After applying a logarithmic transform to the magnitude components, the change in magnitude caused by the reflection of the ultrasonic signal off of the moving object, or person, will be more easily identifiable.

In this way, the signal-processing component 314 may generate magnitude components and phase components that represent the frequency components (magnitude and phase) of the audio signals that represent reflected signals that correspond to the ultrasonic signal. Generally, the magnitude components and phase components may be complex numbers that represent the audio signals at each frequency. Thus, the magnitude components and phase components may represent frequency content for audio signals from each audio channel generated by the microphone array 112 after various digital processing has been performed on the audio signals by the signal-processing component 314. The magnitude components may be represented as logarithmic values (dB), and the phase components may be represented by radian and/or degree values. In this way, the signal-processing component 314 may generate magnitude components and phase components representing audio signals generated by two or more microphones in the microphone array 112 over a period of time (e.g., 8 seconds).

The computer-readable media 304 may further store a feature-extraction component 320 that, when executed by the processor(s) 302, cause the processor(s) to extract the magnitude feature data 316 and phase feature data 318 from the magnitude and phase components generated by the signal-processing component 314. The feature-extraction component 320 may perform various operations for normalizing and stacking features of the magnitude components and phase components for each audio channel from the microphone array 112. For example, the feature-extraction component 320 may receive the complex numbers (e.g., magnitude components and phase components) and remove the first order statistics. Further, the feature-extraction component 320 may perform feature stacking to stack the magnitude components across N time intervals to create magnitude feature data 316, and stack the phase components to create phase feature data 318. In some examples, the feature-extraction component 320 may create the phase feature data 318 may determining differences between phase components of the different audio channel paths from the microphones of the array 112.

In some examples, the feature-extraction component 320 may further perform normalization and remove background noise. For instance, the presence-detection device 104 may, at least periodically, activate one or more microphones in the array 112 to generate audio signals representing background noise in an environment of the presence-detection device 104. The components of the presence-detection device 104 may analyze the background audio signal(s) representing the background noise, and the feature-extraction component 320 may further create background audio data which represents the background noise. Thus, once the feature-extraction component 320 has generated the magnitude feature data 316 and/or the phase feature data 318, the feature-extraction component 320 may utilize the background audio data to subtract, or otherwise remove, the representation of the background noise from the magnitude feature data 316 and/or the phase feature data 318. In this way, the feature-extraction component 320 may cause the background noise, such as a ceiling fan, a television, a refrigerator, etc., to not be represented in or by the magnitude feature data 316 and/or the phase feature data 318.

In some examples, the magnitude feature data 316 and the phase feature data 318 may generally represent binned frequency features over time, such as 1 dimensional binned frequency features over time that represent reflections of the ultrasonic signal. In various examples, the phase feature data 318 may comprise phase differences between multiple microphones, such as a phase difference between phase components of audio data generated at least in part by the respective microphones 206(1) and 206(2).

The computer-readable media 304 may further store a time-sequence classification component 322 configured to, when executed by the processor(s) 302, input the magnitude feature data 316 and the phase feature data 318 into one or more machine-learning model(s) 332 in order to classify the magnitude feature data 316 and/or phase feature data 318 as indicating movement of an object in the environment, a direction of the movement, and/or a number of objects moving in the environment. The machine-learning (ML) model(s) 332 may comprise any type of ML model(s) 332 (e.g., neural networks, linear regression, decision tree, Naïve Bayes, etc.) that may be trained to receive magnitude feature data 316 and phase feature data 318 as inputs, and determine outputs indicating whether the magnitude feature data 316 and phase feature data 318 represent movement of an object, a direction of that movement, and/or a number of objects moving.

The time-sequence classification component 322 may further perform various techniques to train the ML model(s) 332. For instance, an ML model(s) 332, such as a neural network, may be trained with training data (e.g., magnitude feature data 316 and phase feature data 318) that is tagged as no movement (or minor movement), and training data tagged as movement (or major movement such as walking). Generally, the training data may comprise feature vectors of magnitudes of reflections of different ultrasonic signals off of objects over a period of time (e.g., windowing and feature stacking to represent the period of time). In this way, the ML model(s) 332 may be trained to identify input feature vector as representing reflections of ultrasonic signals that reflected off a moving object, or that did not reflect off a moving object.

Further, the ML model(s) 332 may additionally be trained to identify the direction of movement of the object through the environment. The microphone array 112 may include multiple microphones that generate, or otherwise are used to create, multi-channel feature data for frequency components of the reflection of the ultrasonic signal, such as phase components and phase feature data 318. The ML model(s) 332 may be trained using phase feature data 318 representing the phase components, or phase feature data 318 representing differences between the phase components, from multiple microphones of the array 112. For instance, the ML model(s) 332 may be trained to identify, based on a comparison between phase components representing the reflection of the ultrasonic signal detected by two different microphones 206, a direction of the object as it moves through the environment.

In even further examples, the ML model(s) 332 may be trained to determine a number of people in the environment that are moving. As an example, the microphone array 112 in the presence-detection device 104 may include multiple microphones to generate, at least partly using various components of the presence-detection device 104, phase feature data 318, the model(s) 332 may identify, from the differences in phase components for audio signals generated by multiple microphones represented in the phase feature data 318, movement at various angles (in degrees or radians) that indicate multiple objects moving. For example, the phase feature data 318 may indicate that movement is detected at substantially 180 degrees from a defined axis of the array 112, and also at substantially 30 degrees from the defined axis. The ML model(s) 332 may be trained to determine that, if the difference in the angles are large enough, or over a threshold difference, multiple objects must be moving in the environment rather than one large object.

The computer-readable media 304 may further store a context component 324 configured to, when executed by the processor(s) 302, aggregate and communicate various contextual information between components. For example, the context component 324 may receive, and potentially further analyze, calibration data received from the calibration component 312, such as environment calibration data and/or device calibration data.

Further, the context component 324 may further receive classification results data from the time-sequence classification component 322. For example, the time-sequence classification component 322 and/or the ML model(s) 322 may analyze the magnitude feature data 316 and the phase feature data 318 and output confidence scores associated with one or more of (i) detecting movement of an object, (ii) detecting a direction of the movement, and (iii) detecting one or multiple objects moving in the environment of the presence-detection device 104. The context component 324 may be configured to determine if those confidence scores are above or below threshold values, and also determine actions for the presence-detection device 104 to perform based on the confidence scores being above or below threshold values. Generally, the threshold values may be associated with confidence values that indicate a high-degree, or sufficiently high-degree, of certainty that movement was detected, a direction of the movement, and/or that multiple objects were detected as moving. For instance, if the ML model(s) 332 outputs confidence scores that are higher than an 85% chance that movement was detected, the context component 324 may confirm or determine that movement was in fact detected and perform various operations. The confidence threshold values may be adjusted as desired, such as to err on various sides of detecting movement, or not detecting movement. For instance, the context component 324 may have fairly high threshold values in order to prevent the presence-detection device 104 from performing operations in instances where movement was incorrectly identified due to a lower threshold value.

The computer-readable media 304 may further store a context component 324 configured to, when executed by the processor(s) 302, cause the processor(s) 302 to play audio such as music songs or other audio files. The audio-player component 326 may cause audio data to be provided to the loudspeaker(s) 110 to be converted into sound. In some examples, prior to providing the audio data to the loudspeaker(s) 110, the audio data may be stored in an audio-data buffer 330. In such examples, the signal-generation component 310 (or another component) may analyze the audio data stored in the audio-data buffer 330 and determine how to mix the audio data, such as music data, with audio data representing the ultrasonic signal such that the output sound does not experience saturation. Further description of the mixing is found with reference to FIG. 6.

The presence-detection device 104 may comprise any type of portable and/or fixed device and include one or more input devices 334 and output devices 336. The input devices 334 may include a keyboard, keypad, lights, mouse, touch screen, joystick, control buttons, etc. The output devices 336 may include a display, a light element (e.g., LED), a vibrator to create haptic sensations, or the like. In some implementations, one or more loudspeakers 110 may function as output devices 336 to output audio sounds.

The presence-detection device 104 may have one or more network interfaces 338 such as a wireless or Wi-Fi network communications interface, an Ethernet communications interface, a cellular network communications interface, a Bluetooth communications interface, etc., for communications over various types of networks, including wide-area network, local-area networks, private networks, public networks etc. In the case of a wireless communications interfaces, such interfaces may include radio transceivers and associated control circuits and logic for implementing appropriate communication protocols.

The network interface(s) 338 may enable communications between the presence-detection device 104 and the secondary devices 108, as well as other networked devices. Such network interface(s) can include one or more network interface controllers (NICs) or other types of transceiver devices to send and receive communications over a network.

For instance, the network interface(s) 338 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) 338 may include a wide area network (WAN) component to enable communication over a wide area network. The networks may represent an array of wired networks, wireless networks, such as WiFi, or combinations thereof.

Figure 4:
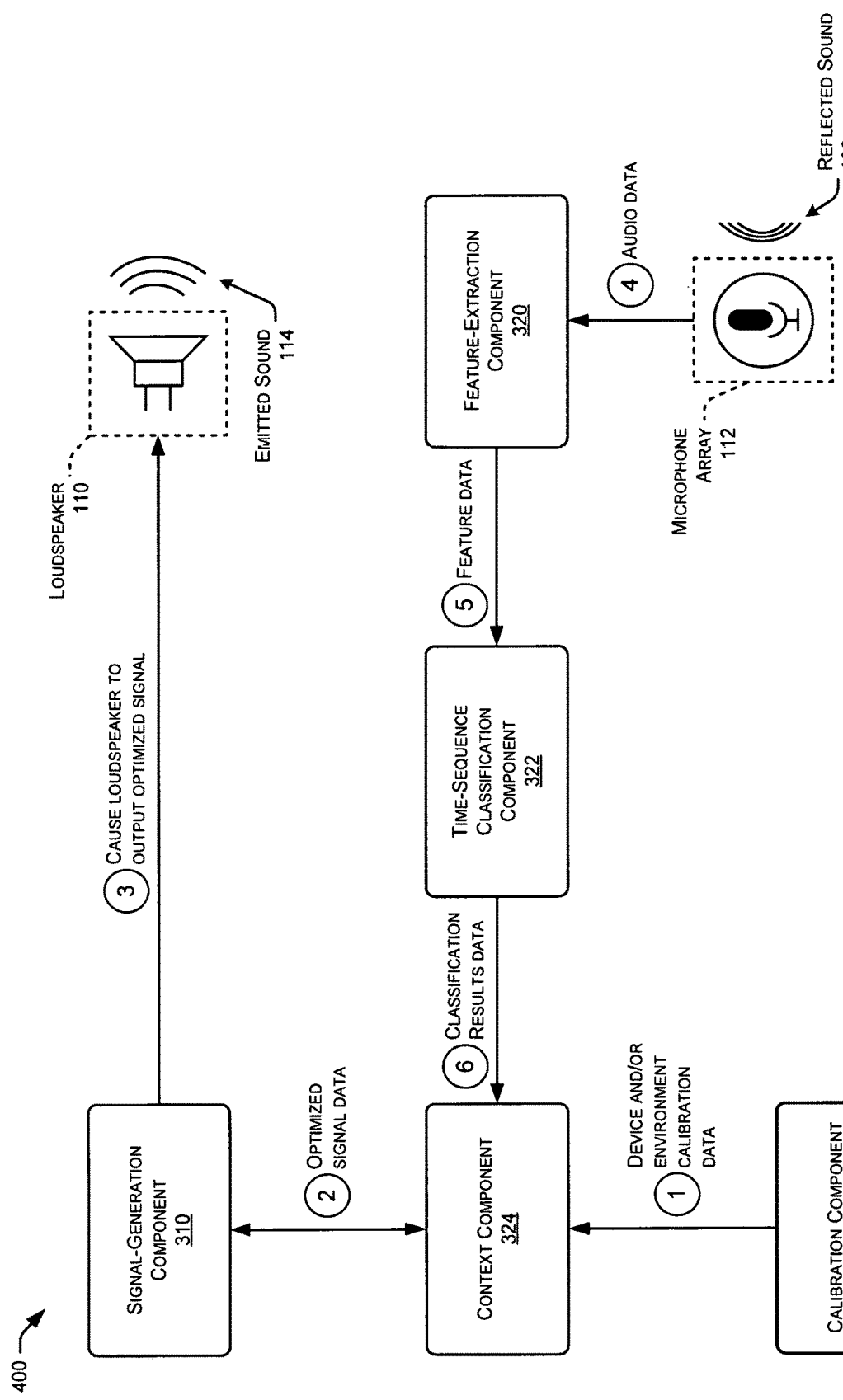
FIG. 4 illustrates an example high-level process for generating and emitting an ultrasonic signal into an environment, and analyzing audio data representing reflections of the ultrasonic signal off objects in the environment to detect presence or a user.

FIG. 4 illustrates an example high-level process 400 for generating and emitting an ultrasonic signal into an environment, and analyzing audio data representing reflections of the ultrasonic signal off objects in the environment to detect presence or a user.

As illustrated, the calibration component 312 may initially determine device and/or environment calibration data. In some examples, the calibration component 312 may cause the signal-generation component 310 to generate audio data representing a calibration tone, such as an ultrasonic sweep signal, to determine audio characteristics of the environment of the presence-detection device 104. The calibration component 312 may perform device calibration to determine an optimal frequency range for ultrasonic signals to be emitted by the loudspeaker(s) 110 into the environment. For instance, the calibration component 312 may analyze various frequency ranges included in the sweep frequency range of the ultrasonic sweep signal and determine signal-to-noise (SNR) values for one or more frequency ranges. The calibration component 312 may determine which sub-frequency range in the sweep frequency range of the ultrasonic sweep signal has the best SNR value. Further, the calibration component 312 may generate, at least periodically, background noise audio data that represents background noise in the environment that may interfere with analysis of audio data that represents the ultrasonic signal. In this way, means subtraction may be performed to remove the unwanted background noise from the audio data representing the ultrasonic signal.

The context component 324 at "2" may provide the signal-generation component 310 with an indication of optimized signal data. For example, the context component 324 may determine, based at least partly on the SNR values for frequency ranges of audio data representing the ultrasonic sweep signal, a frequency and/or frequency range with a high, or the highest, SNR value for the environment. Additionally, the optimized signal data may indicate an optimized power at which to emit the ultrasonic signal. For example, the calibration component 312 may determine a size of the room using the sweep signal. The context component 324 may then determine a power that is appropriate for the room. Larger rooms may require an ultrasonic signal that is powered at a higher power than smaller rooms. Further, the optimized signal data may indicate whether the ultrasonic signal should be emitted continuously, periodically, pulsed, etc.

The signal-generation component 310 may, at "3", cause the loudspeaker(s) 110 to output an ultrasonic signal (e.g., emitted sound 114) that is optimized according to the optimized signal data received from the context component 324 at "2."

At least two microphones in the microphone array 112 may, at "4," generate and provide audio data to the feature-extraction component 320. The feature-extraction component 320 may perform various processing techniques on the multi-channel audio data streams and provide feature data at "5" to the time-sequence class cation component 322.

The time-sequence class cation component 322 may analyze the feature data (e.g., magnitude feature data 316, phase feature data 318, etc.), such as by using the ML model(s) 332, determine classification results data, and provide the classification results data at "6" to the context component 324. In some examples, the time-classification results data may indicate confidence scores associated with one or more of (i) detecting movement of an object, (ii) detecting a direction of the movement, and (iii) detecting one or multiple objects moving in the environment of the presence-detection device 104.

Figure 5:
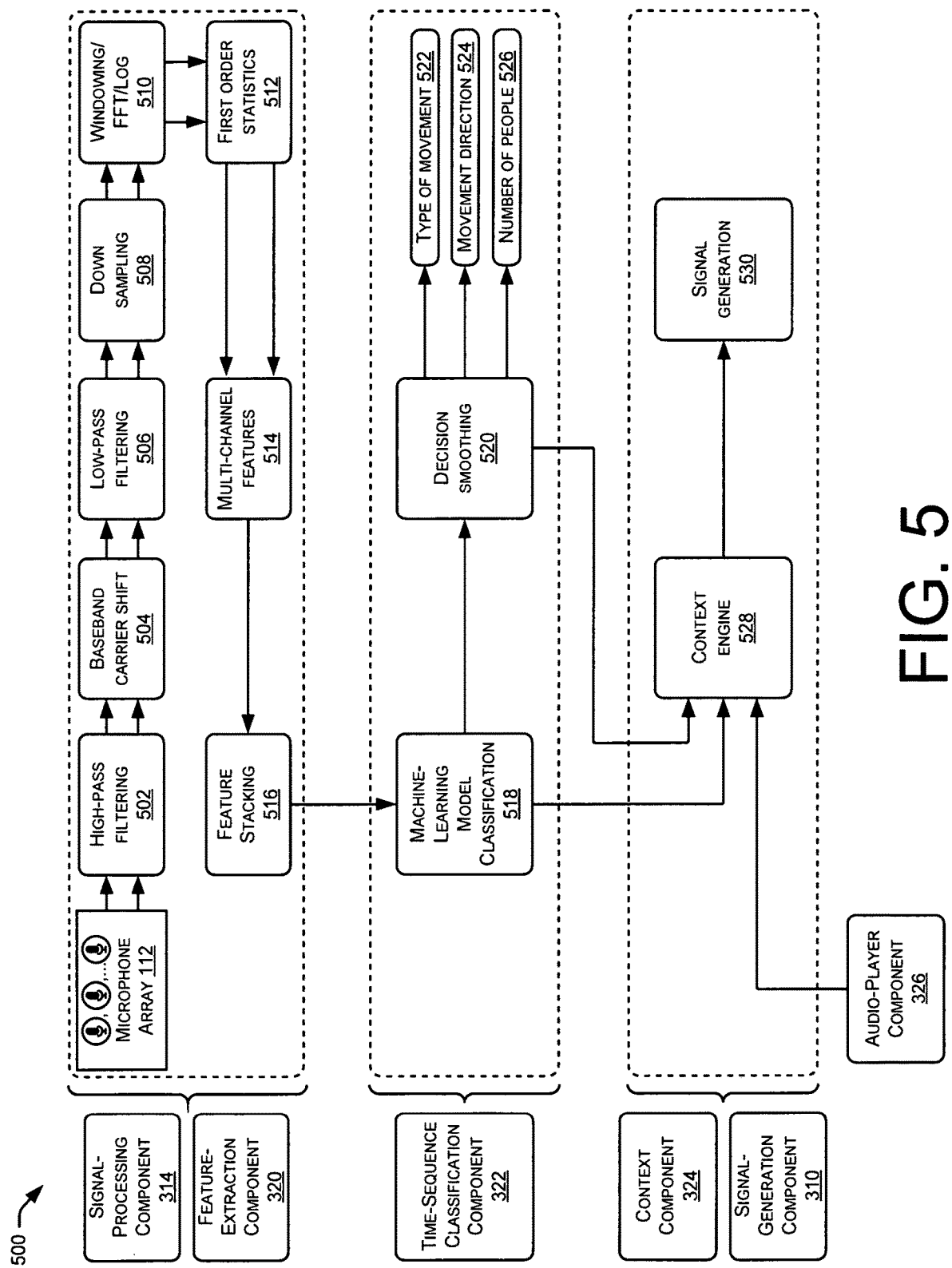
FIG. 5 illustrates an example high-level process for generating and emitting an ultrasonic signal into an environment, and analyzing audio data representing reflections of the ultrasonic signal off objects in the environment to detect presence or a user.

FIG. 5 illustrates an example high-level process 500 for generating and emitting an ultrasonic signal into an environment, and analyzing audio data representing reflections of the ultrasonic signal off objects in the environment to detect presence or a user.

At illustrated, at least two microphones in a microphone array 112 may generate multi-channel audio data. The signal-processing component 314 may perform high-pass filtering on the multi-channel audio data at 502 to remove audio data in unwanted frequencies, baseband carrier shift at 504 to modulate the audio signal back to baseband frequency from carrier frequency, perform low-pass filtering on the multi-channel audio data at 506 to remove audio data in unwanted frequencies, and perform down sampling on the multi-channel audio data streams at 508 to produce an approximation or representation of the audio signals generated by the microphone array 112, but at a lower frequency rate. The signal-processing component 314 may, at 510, then perform windowing, fast Fourier transforms, and logarithmic transforms on the audio data at 510 to generate magnitude feature data 316 and phase feature data 318.

The feature-extraction component 320 may identify the first order statistics of the magnitude and frequency components in the magnitude feature data 316 and phase feature data 318, and generate multi-channel features at 514. For example, the feature-extraction component 320 may select magnitude feature data 316 from one of the multi-channel audio streams, and also determine phase feature data 318 that represents differences in phase components between phase components for two audio streams from two microphones.

At 516, the feature-extraction component 320 may perform feature stacking using the magnitude feature data 316 and phase feature data 318 to generate binned audio feature data over time. For example, the magnitude feature data 316 may comprise a 1-dimensional vector, and the phase differences between phase components be also be a 1-dimensional array representing audio data streams over a period of time that represent the ultrasonic signal reflected off objects in the environment.

At 518, the time-sequence classification component 322 may perform machine-learning model classification. For instance, the time-sequence classification component 322 may input the magnitude feature data 316 and phase feature data 318 received from the feature stacking at 518 in the ML model(s) 332. The ML model(s) 318 may output binary answers (e.g., "1" or "0," "yes" or "no<," etc.) and/or probability scores that indicate one or more of (i) motion of a person, (ii) a direction of the motion of the person, or (iii) a number of people in the room. At 520, the time-sequence classification component 322 may perform decision smooth to ensure that the ML model(s) 332 did not output a false positive. For example, the time-sequence classification component 322 may perform similar techniques using the ML model(s) 332 for a subsequent period of time that at least partly overlaps with the period of time for which audio data that was just analyzed. If the audio data representing the ultrasonic signal for the partly overlapping period of time also indicates the same answer regarding movement, direction of movement, and/or number of people, the time-sequence classification component 322 may determine that there was not a false positive (and determine there was a false positive if not).

The time-sequence classification component 322 may then output at least one of a type of movement at 522 (e.g., no movement, minor movement, major movement, etc.), a movement direction 524 relative to the presence-detection device 104, and/or a number of people 526 in the environment. In some examples, the time-sequence classification component 322 may determine that the objects moving are people based at least in part on a line-of-sight of the presence-detection device 104 (or the loudspeaker(s) 110 and/or microphone array 112).

In some examples, the context component 324 may provide inputs in the context engine 528 in order to drive the signal-generation component 310 to perform signal generation at 530. For example, the context component 324 may provide input into signal generation 520 indicating an optimized signal frequency, how to mix the audio data representing the ultrasonic signal with other audio data that is provided to the loudspeaker(s) 110 to be converted into sound, an indication of a type of ultrasonic signal to emit (e.g., continuous, periodic, etc.) and/or other data.

Figure 6:
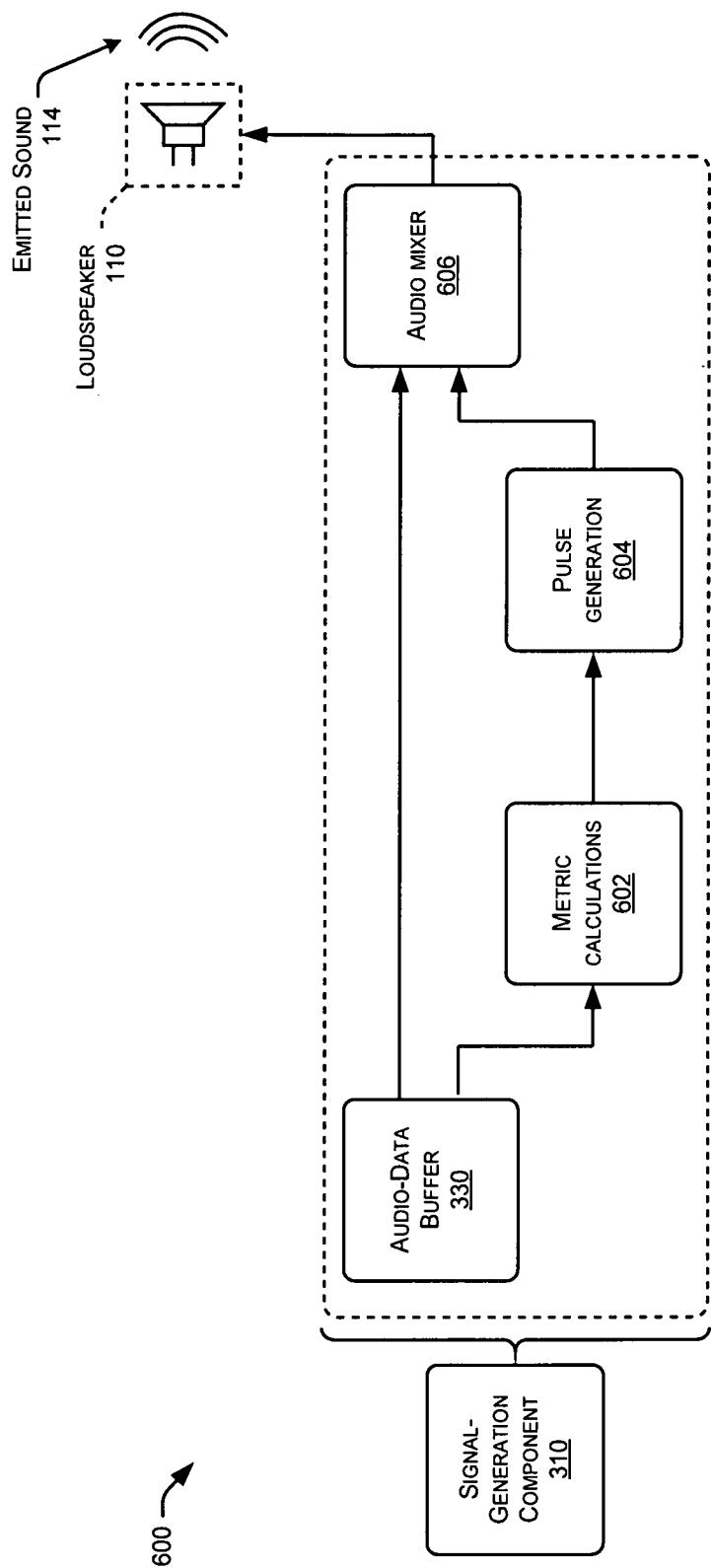
FIG. 6 illustrates an example process for mixing a pulse of an ultrasonic signal with audio data, such as music data, to be output as mixed audio data by a loudspeaker of a presence-detection device.

FIG. 6 illustrates an example process 600 for mixing a pulse of an ultrasonic signal with audio data, such as music data, to be output as mixed audio data by a loudspeaker of a presence-detection device.

In some examples, the signal-generation component 310 may analyze audio data stored in the audio-data buffer 330, such as music data. For example, the presence-device 104 may buffer music data in the audio-data buffer 330 prior to causing the loudspeaker(s) 110 to convert the music data into sound. The signal-generation component 310 may analyze the music data (or any other audio data) in the audio-data buffer 330 and determine various metric calculations at 602. For example, the signal-generation component 310 may determine portions of the music data at which the audio data representing the ultrasonic signal is to be mixed. Generally, the signal-generation component 310 may identify portions where the music data, if mixed with the audio data representing the ultrasonic signal, would not experience saturation. The music data and audio data are played as a time domain signal and are often presented in 16-bit numbers. In an integer representation, if a signal has been compressed too much, or portions of the music is loud and requires almost the entire time-range of the numbers, the audio data representing the ultrasonic signal cannot be inserted or mixed at that location without causing saturation. Thus, the signal-generation component 310 may identify portions of the music data to determine if saturation will occur if the audio data representing the ultrasonic signal is mixed at those locations. The signal-generation component 310 may identify one or more locations at which to insert or mix the audio data into the music data, and perform pulse generation at 604 where the audio data representing the ultrasonic signal is generated. At 606, the signal-generation component 310 may mix the audio data representing the ultrasonic signal into the portion of the music data such that saturation is avoided when the resulting mixed audio data is converted into emitted sound 114 by the loudspeaker 110.

Figure 7:
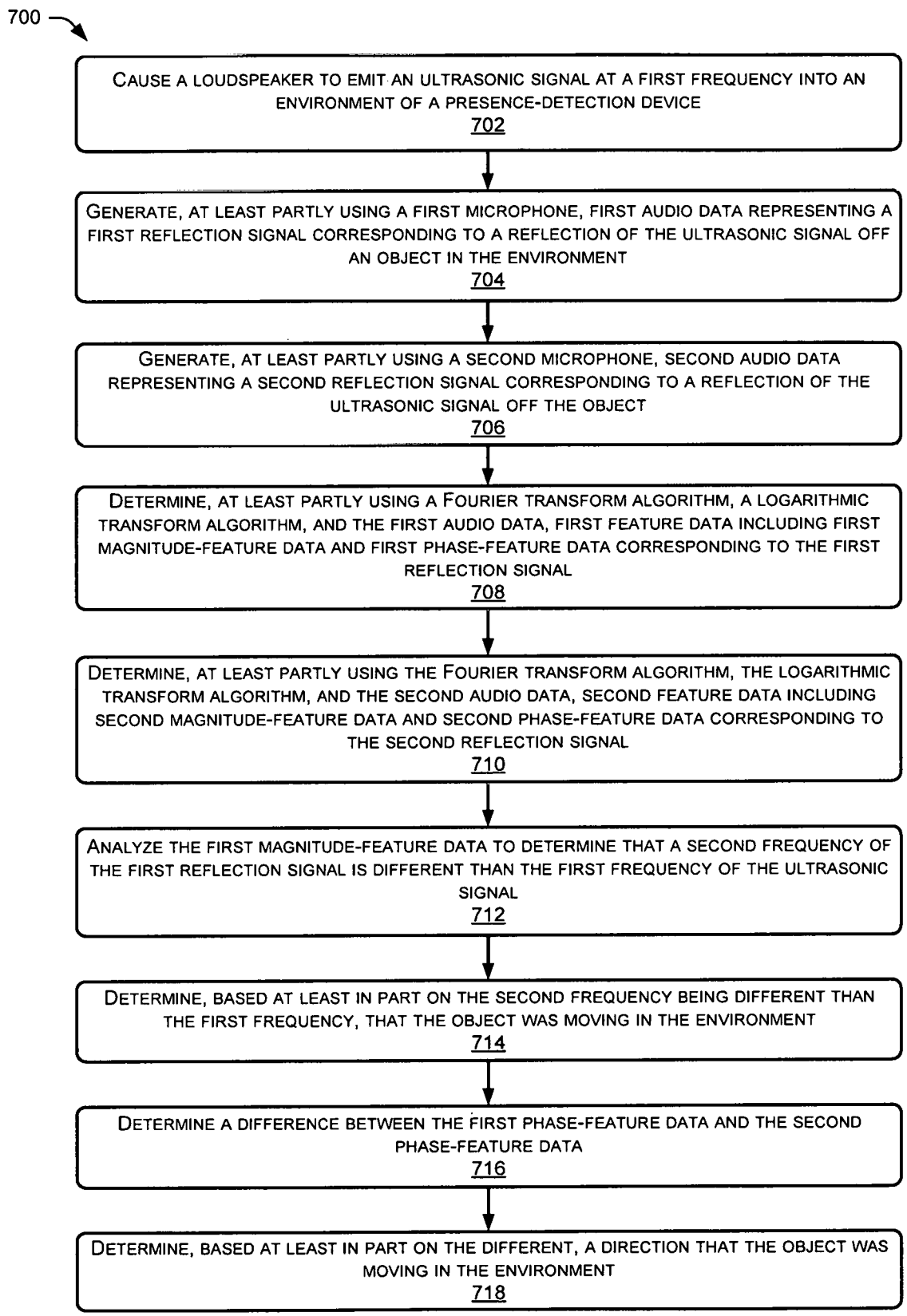
FIG. 7 illustrates a flow diagram of an example process for detecting movement of a user in an environment, and also a direction that the user is moving in the environment.
Figure 9:
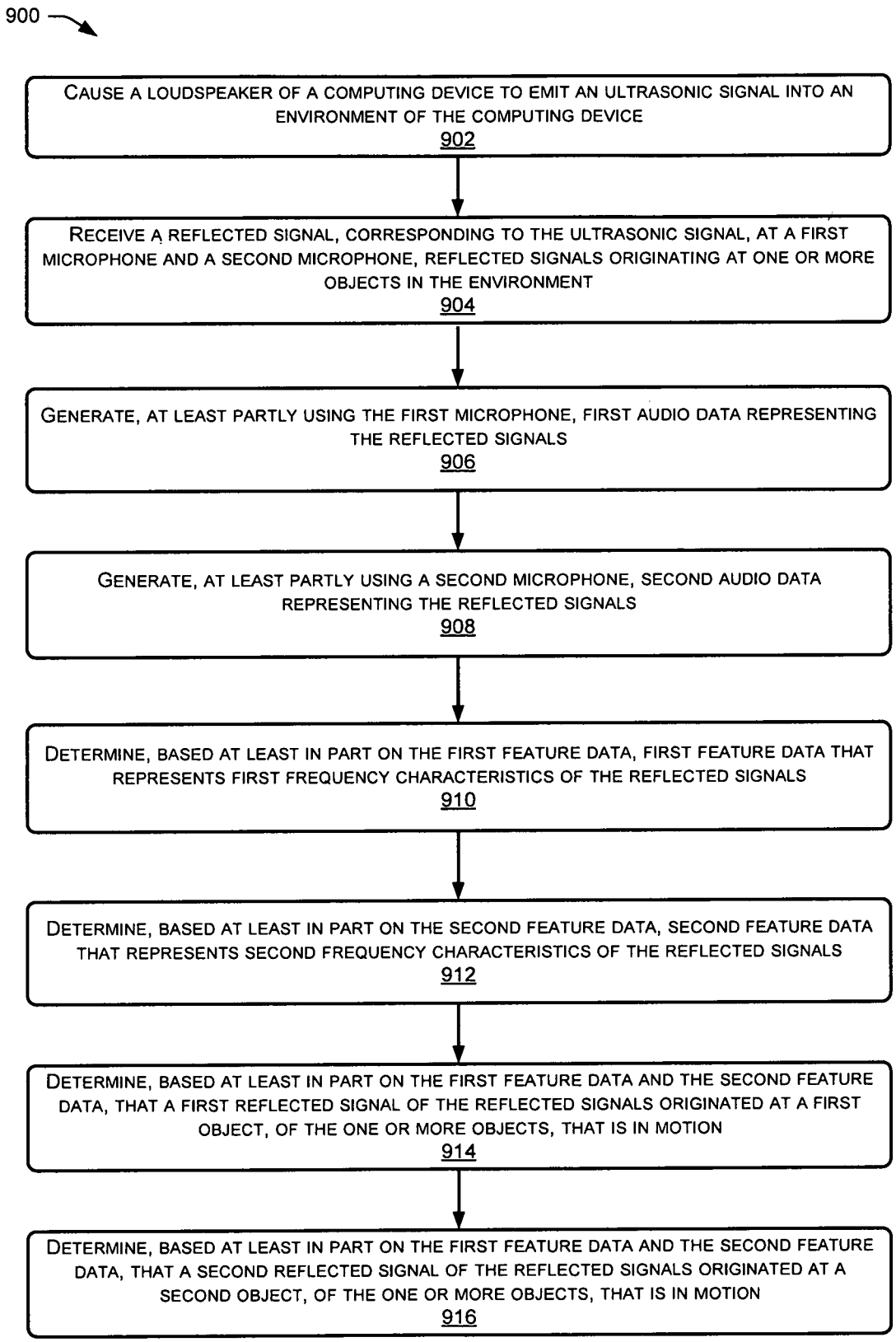
FIG. 9 illustrates a flow diagram of an example process for using ultrasonic signals to detect movement of multiple users in an environment.

FIGS. 7-9 illustrate flow diagrams of example processes/methods 700, 800, and 900. These processes (as well as each process or method described herein,) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations, can be combined in any order and/or in parallel to implement the process.

FIG. 7 illustrates a flow diagram of an example process 700 for detecting movement 120 of a user 106 in an environment 102, and also a direction that the user is moving in the environment 102. In some examples, the process 700 may be performed by one or more components of a presence-detection device 104. The presence-detection device 104 may include a microphone array 112 including a first microphone 206(1) and a second microphone 206(2), a loudspeaker(s) 110, one or more processors 302, and one or more computer-readable media storing computer-executable instructions (e.g., components) that are executed by the processor(s) 302 to perform the process 700.

At 702, the presence-detection device 104 may cause the loudspeaker to emit an ultrasonic signal at a first frequency into an environment of the presence-detection device. For example, the signal-generation component 310 may cause the loudspeaker 110 to emit a continuous ultrasonic signal over a period of time, or a pulsed ultrasonic signal over a period of time.

At 704, the presence-detection device 104 may generate, at least partly using the first microphone 206(1), first audio data representing a first reflection signal corresponding to a reflection of the ultrasonic signal off an object in the environment.

At 706, the presence-detection device 104 may generate, at least partly using the second microphone, second audio data representing a second reflection signal corresponding to a reflection of the ultrasonic signal off the object.

At 708, the presence-detection device 104 may determine, at least partly using a Fourier transform algorithm, a logarithmic transform algorithm, and the first audio data, first feature data including first magnitude-feature data and first phase-feature data corresponding to the first reflection signal. For example, the signal-processing component 314 may perform various operations on an audio channel from the first microphone 206(1) to determine the magnitude feature data 316 and the phase feature data 318.

At 710, the presence-detection device 104 may determine, at least partly using the Fourier transform algorithm, the logarithmic transform algorithm, and the second audio data, second feature data including second magnitude-feature data and second phase-feature data corresponding to the second reflection signal. For example, the signal-processing component 314 may perform various operations on an audio channel from the second microphone 206(2) to determine the magnitude feature data 316 and the phase feature data 318.

At 712, the presence-detection device 104 may analyze the first magnitude-feature data to determine that a second frequency of the first reflection signal is different than the first frequency of the ultrasonic signal. For instance, the time-sequence classification component 322 and/or the context component 324 may utilize an ML model(s) 332 to determine that the magnitude feature data 316 represents a frequency that is different (such as increased or decreased) than a frequency at which the ultrasonic signal was emitted.

At 714, the presence-detection device 104 may determine, based at least in part on the second frequency being different than the first frequency, that the object was moving in the environment. For instance, the ML model(s) 332 may be trained to determine that the shift in the frequency spectrum represents a Doppler shift based on movement of the object.

At 716, the presence-detection device 104 may determine a difference between the first phase-feature data and the second phase-feature data. For instance, the feature-extraction component 320 may determine a difference between phase components, over time, represented in the first phase-feature data and the second phase-feature data.

At 718, the presence-detection device 104 may determine, based at least in part on the difference between the first phase-feature data and the second phase-feature data, a direction that the object was moving in the environment. For example, the time-sequence classification component 322 may input phase feature data 318 representing differences between phase components of audio signals in the frequency domain. In various examples, the ML model(s) 332 may be trained based on orientations of the microphones in the microphone array 112 to determine directions of movements based on the orientations of the microphones and the differences in the phase components representing audio signals that were generated by the microphones.

In some examples, the presence-detection device 104 may further utilize phase feature data 318 to identify or determine multiple moving objects in the environment. For example, the process 700 may further include determining, based at least in part on at least one of the first audio data or the second audio data, third feature data including third phase-feature data corresponding to a third reflection signal corresponding to a reflection of the ultrasonic signal, determining a first phase angle represented by at least one of the first phase-feature data or the second phase-feature data, determining a second phase angle represented by the third phase-feature data, and determining, based at least in part on a second difference between the first phase angle and the second phase angle, that a second object was moving in the environment.

In various examples, the process 700 may further perform various operations for calibrating the presence-detection device 104. For instance, the calibration component 312 may perform further operations in the process 700, including causing the loudspeaker to emit, over a period of time, an ultrasonic sweep signal into the environment, the ultrasonic sweep signal being emitted at different frequencies in a sweep frequency range during the period of time, generating, at least partly using a microphone of the microphone array, third audio data representing the ultrasonic sweep signal, determining a first signal-to-noise (SNR) ratio for a first frequency range within the sweep frequency range of the ultrasonic sweep signal, determining a second SNR ratio for a second frequency range within the sweep frequency range of the ultrasonic sweep signal, the second frequency range being different than the first frequency range, determine that the first SNR ratio is greater than the second SNR ratio, and configuring the loudspeaker to emit the ultrasonic signal at a frequency that is within the first frequency range. In this way, the loudspeaker 110 emits the ultrasonic frequency in a range that has a more optimized SNR ratio and a better response for the reflected signals.

In some examples, the presence-detection device 104 may mix the audio data representing the ultrasonic signal with other audio data, such as music data, at a specific location to avoid saturation of the signals. For example, the signal-generation component 310 may, prior to the loudspeaker outputting music data, identify a portion of the music data comprising a number of bits music data that is less than a threshold number of bits, wherein the threshold number of bits is associated with preventing audio saturation, mix third audio data representing the ultrasonic signal with the portion of the music data to generate fourth audio data, and cause the loudspeaker to output sound corresponding to the fourth audio data.

FIG. 8 illustrates a flow diagram of another example process 800 for detecting movement of a user in an environment, and also a direction that the user is moving in the environment. In some examples, the process 800 may be performed by one or more components of a presence-detection device 104. The presence-detection device 104 may include a microphone array 112 including a first microphone 206(1) and a second microphone 206(2), a loudspeaker(s) 110, one or more processors 302, and one or more computer-readable media storing computer-executable instructions (e.g., components) that are executed by the processor(s) 302 to perform the process 800.

At 802, the presence-detection device 104 may cause the loudspeaker to emit an ultrasonic signal in an environment. For example, the signal-generation component 310 may cause the loudspeaker 110 to emit a continuous ultrasonic signal over a period of time, or a pulsed ultrasonic signal over a period of time.

At 804, the presence-detection device 104 may receive a reflected signal, corresponding to the ultrasonic signal, at the first and the second microphones, the reflected signal originating at an object in the environment.

At 806, the presence-detection device 104 may generate, at least partly using the first microphone 206(1), first audio data representing the reflected signal. At 808, the presence-detection device 104 may generate, at least partly using the second microphone 206(2), second audio data representing the reflected signal.

At 810, the presence-detection device 104 may determine, based at least in part on the first audio data, first feature data representing first frequency characteristics of the reflected signal. For instance, the signal-processing component 314 may perform various operations on an audio channel from the first microphone 206(1) to determine the magnitude feature data 316 and the phase feature data 318.

At 812, the presence-detection device 104 may determine, based at least in part on the second audio data, second feature data representing second frequency characteristics of the reflected signal. For example, the signal-processing component 314 may perform various operations on an audio channel from the second microphone 206(2) to determine the magnitude feature data 316 and the phase feature data 318.

In various examples, determining the feature data at 810 and 812 may include decomposing the audio data into magnitude data and phase data corresponding to a frequency of the reflected signal, and applying a logarithmic transform algorithm to the magnitude data.

At 814, the presence-detection device 104 may determine, based at least in part on the first feature data, that the object that is in motion. For instance, the time-sequence classification component 322 and/or the context component 324 may utilize an ML model(s) 332 to determine that the magnitude feature data 316 represents a frequency that is different (such as increased or decreased) than a frequency at which the ultrasonic signal was emitted. Additionally, the ML model(s) 332 may be trained to determine that the shift in the frequency spectrum represents a Doppler shift based on movement of the object.

At 816, the presence-detection device 104 may determine, based at least in part on the first feature data and the second feature data, a direction associated with the motion. For example, the time-sequence classification component 322 may input phase feature data 318 representing differences between phase components of audio signals in the frequency domain. In various examples, the ML model(s) 332 may be trained based on orientations of the microphones in the microphone array 112 to determine directions of movements based on the orientations of the microphones and the differences in the phase components representing audio signals that were generated by the microphones.

In some examples, the presence-detection device 104 may perform various techniques to calibrate the loudspeaker 110 to emit the ultrasonic signal at a more optimized frequency range. For example, the calibration component 312 may cause the loudspeaker to emit, over a period of time, an ultrasonic sweep signal into the environment, the ultrasonic sweep signal being emitted at different frequencies over a sweep frequency range, generate, at least partly using at least one of the first microphone or the second microphone, third audio data representing the ultrasonic sweep signal for the period of time, determine a first signal-to-noise (SNR) ratio for a first frequency range within the sweep frequency range of the ultrasonic sweep signal, determine a second SNR ratio for a second frequency range within the sweep frequency range of the ultrasonic sweep signal, determine that the first SNR ratio is greater than the second SNR ratio, and configure the loudspeaker to emit the ultrasonic signal at a frequency that is within the first frequency range.

In various examples, the presence-detection device 104 may include an audio-data 330 buffer storing third audio data, such as music audio data, and perform further operations. For example, prior to the loudspeaker outputting the third audio data, the signal-generation component 310 may identify a portion of the third audio data comprising a number of bits music data that is less than a threshold number of bits, mix fourth audio data representing the ultrasonic signal with the portion of the third audio data to generate fifth audio data, and cause the loudspeaker to output sound represented by the fifth audio data. In such examples, an analog equivalent of the third audio data is associated with a first frequency range that is less than 20 kilo-hertz (kHz), and an analog equivalent of the fourth audio data is associated with a second frequency range that is greater than 20 kHz.

In some instances, the time-sequence classification component 322 may perform various operations for decision smoothing when determining whether a reflected signal was reflected off the object that is in motion. In such examples, the loudspeaker may emit the ultrasonic signal for a period of time, the first audio data represents the reflected signal for a first portion of the period of time, and the presence-detection device 104 may generate, at least partly using the first microphone, third audio data representing the reflected signal for a second portion of the period of time, wherein at least part of the second portion of the period of time does not overlap with the first portion of the period of time. Further, the time-sequence classification component 322 may determine, based at least in part on the third audio data, third feature data representing third frequency characteristics of the reflected signal detected at the first microphone, and determine that the third frequency characteristics indicate that the reflected signal was reflected off the object that is in motion. As a specific example, the time-sequence classification component 322 may determine that 8 seconds of audio data representing the ultrasonic signal indicate that the object is in motion, and that 8 additional seconds of audio data that at least partially overlaps with the 8 original seconds (e.g., overlap by at least 2 seconds) also indicates that the object is in motion. This may help reduce false positives in detecting a moving object.

In some instances, the presence-detection device 104 may perform mean subtraction to remove background noise of the environment from the audio data representing the ultrasonic signal. For example, the signaling-processing component 314 may generate, at least partly using at least one of the first microphone or the second microphone, third audio data representing noise in the environment. In some examples, the third audio data may be generated when the ultrasonic signal is not being emitted. The signaling-processing component 314 may further determine third feature data representing third frequency characteristics of the noise. Stated otherwise, the signaling-processing component 314 may create feature data representing background noise in the environment, such as noise created by a ceiling fan, television, etc. The signaling-processing component 314 may take an average of the feature data representing the background noise overtime to create averaged feature data. The signaling-processing component 314 may then remove a portion of feature data from the first feature data that corresponds to the third feature data. In this way, the signaling-processing component 314 may remove at least a portion of the audio data that represents background noise when processing the audio data that represents the ultrasonic signal.

FIG. 9 illustrates a flow diagram of an example process 900 for using ultrasonic signals to detect movement of multiple users in an environment. In some examples, the process 900 is utilized to determine that two (or more) objects, such as two users, are moving in an environment. In some examples, the process 900 may be performed by one or more components of a presence-detection device 104. The presence-detection device 104 may include a microphone array 112 including a first microphone 206(1) and a second microphone 206(2), a loudspeaker(s) 110, one or more processors 302, and one or more computer-readable media storing computer-executable instructions (e.g., components) that are executed by the processor(s) 302 to perform the process 900.

At 902, the presence-detection device 104 may cause a loudspeaker of a computing device to emit an ultrasonic signal into an environment of the computing device.

At 904, the presence-detection device 104 may receive a reflected signal, corresponding to the ultrasonic signal, at a first microphone and a second microphone, reflected signals originating at one or more objects in the environment.

At 906, the presence-detection device 104 may generate, at least partly using the first microphone, first audio data representing the reflected signals. At 908, the presence-detection device 104 may generate, at least partly using the second microphone, second audio data representing the reflected signals.

At 910, the presence-detection device 104 may determine, based at least in part on the first audio data, first feature data that represents first frequency characteristics of the reflected signals.

At 912, the presence-detection device 104 may determine, based at least in part on the second audio data, second feature data that represents second frequency characteristics of the reflected signals.

At 914, the presence-detection device 104 may determine, based at least in part on the first feature data and the second feature data, that a first reflected signal of the reflected signals originated at a first object, of the one or more objects, that is in motion.

At 916, the presence-detection device 104 may determine, based at least in part on the first feature data and the second feature data, that a second reflected signal of the reflected signals originated at a second object, of the one or more objects, that is in motion.

As used herein, a processor, such as processor(s) 302 may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 302 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 302 may possess its own local memory, which also may store program components, program data, and/or one or more operating systems.

As described herein, computer-readable media and/or memory 304 may include volatile and nonvolatile memory, removable and non-removable media implemented in any method or technology for storage of information, such as computer-readable instructions, data structures, program component, or other data. Such computer-readable media and/or memory 304 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media may be implemented as computer-readable storage media ("CRSM"), which may be any available physical media accessible by the processor(s) 302 to execute instructions stored on the computer-readable media and/or memory 304. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as computer-readable media and/or memory 304, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 338 may enable communications between the presence-detection device 104 and other networked devices. Such network interface(s) 338 can include one or more network interface controllers (NICs) or other types of transceiver devices to send and receive communications over a network.

For instance, the network interface(s) 338 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, the network interface(s) 338 may include a wide area network (WAN) component to enable communication over a wide area network. The networks that the presence-detection device 104 may communicate over may represent an array of wired networks, wireless networks, such as WiFi, or combinations thereof.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A presence-detection device comprising:
 a microphone array including a first microphone oriented a first direction and a second microphone oriented in a second direction;
 a loudspeaker;
 one or more processors; and
 one or more computer-readable media storing computer-executable instructions that, when executed by the one or more processors, cause the one or more processors to:
  cause the loudspeaker to emit an ultrasonic signal at a first frequency into an environment of the presence-detection device;
  generate, at least partly using the first microphone, first audio data representing a first reflection signal corresponding to a reflection of the ultrasonic signal off an object in the environment;
  generate, at least partly using the second microphone, second audio data representing a second reflection signal corresponding to a reflection of the ultrasonic signal off the object;

determine, at least partly using a Fourier transform algorithm, a logarithmic transform algorithm, and the first audio data, first feature data including first magnitude-feature data and first phase-feature data corresponding to the first reflection signal;

determine, at least partly using the Fourier transform algorithm, the logarithmic transform algorithm, and the second audio data, second feature data including second magnitude-feature data and second phase-feature data corresponding to the second reflection signal;

analyze the first magnitude-feature data to determine that a second frequency of the first reflection signal is different than the first frequency of the ultrasonic signal;

determine, based at least in part on the second frequency being different than the first frequency, that the object was moving in the environment;

determine a difference between the first phase-feature data and the second phase-feature data; and based at least in part on the difference between the first phase-feature data and the second phase-feature data, determine a direction that the object was moving in the environment.

2. The presence-detection device of claim 1, wherein, the object comprises a first object, the difference comprises a first difference, and further comprising computer-executable instructions that, when executed, cause the one or more processors to:

determine, based at least in part on at least one of the first audio data or the second audio data, third feature data including third phase-feature data corresponding to a third reflection signal corresponding to a reflection of the ultrasonic signal;

determine a first phase angle represented by at least one of the first phase-feature data or the second phase-feature data;

determine a second phase angle represented by the third phase-feature data; and determine, based at least in part on a second difference between the first phase angle and the second phase angle, that a second object was moving in the environment.

3. The presence-detection device of claim 1, comprising further comprising computer-executable instructions that, when executed, cause the one or more processors to:

cause the loudspeaker to emit, over a period of time, an ultrasonic sweep signal into the environment, the ultrasonic sweep signal being emitted at a plurality of different frequencies in a sweep frequency range of substantially 27 kilo-hertz (kHz) to substantially 33 kHz during the period of time;

generate, at least partly using a microphone of the microphone array, third audio data representing the ultrasonic sweep signal;

determine a first signal-to-noise (SNR) ratio for a first frequency range within the sweep frequency range of the ultrasonic sweep signal;

determine a second SNR ratio for a second frequency range within the sweep frequency range of the ultrasonic sweep signal, the second frequency range being different than the first frequency range;

determine that the first SNR ratio is greater than the second SNR ratio; and configure the loudspeaker to emit the ultrasonic signal at a frequency that is within the first frequency range.

4. The presence-detection device of claim 1, further comprising:

an audio data buffer storing music data; and further computer-executable instructions that, when executed, cause the one or more processors to:

prior to the loudspeaker outputting the music data, identify a portion of the music data comprising a number of bits of music data that is less than a threshold number of bits, wherein the threshold number of bits is associated with preventing audio saturation;

mix third audio data representing the ultrasonic signal with the portion of the music data to generate fourth audio data; and cause the loudspeaker to output sound corresponding to the fourth audio data.

5. A computing device comprising:

a loudspeaker;

a first microphone;

a second microphone;

one or more processors; and one or more computer-readable media storing computer-executable instructions that, when executed by the one or more processors, cause the one or more processors to:

cause the loudspeaker to emit an ultrasonic signal in an environment;

receive a reflected signal, corresponding to the ultrasonic signal, at the first and the second microphones, the reflected signal originating at an object in the environment;

generate, at least partly using the first microphone, first audio data representing the reflected signal;

generate, at least partly using the second microphone, second audio data representing the reflected signal;

determine, based at least in part on the first audio data, first feature data representing first frequency characteristics of the reflected signal, the first feature data including first magnitude data and first phase data;

determine, based at least in part on the second audio data, second feature data representing second frequency characteristics of the reflected signal, the second feature data including second magnitude data and second phase data;

determine, based at least in part on the first magnitude data, that the object that is in motion; and determine, based at least in part on a difference between the first phase data and the second phase data, a direction associated with the motion.

6. The computing device of claim 5, wherein determining the first feature data comprises:

decomposing the first audio data into the first magnitude data and the first phase data corresponding to a frequency of the reflected signal; and applying a logarithmic transform algorithm to the first magnitude data.

7. The computing device of claim 5, comprising further comprising computer-executable instructions that, when executed, cause the one or more processors to:

cause the loudspeaker to emit, over a period of time, an ultrasonic sweep signal into the environment, the ultrasonic sweep signal being emitted at different frequencies over a sweep frequency range;

generate, at least partly using at least one of the first microphone or the second microphone, third audio data representing the ultrasonic sweep signal for the period of time;

determine a first signal-to-noise (SNR) ratio for a first frequency range within the sweep frequency range of the ultrasonic sweep signal;

determine a second SNR ratio for a second frequency range within the sweep frequency range of the ultrasonic sweep signal;

determine that the first SNR ratio is greater than the second SNR ratio; and configure the loudspeaker to emit the ultrasonic signal at a frequency that is within the first frequency range.

8. The computing device of claim 5, further comprising:
an audio data buffer storing third audio data; and
further computer-executable instructions that, when executed, cause the one or more processors to:
prior to the loudspeaker outputting the third audio data, identify a portion of the third audio data comprising a number of bits music data that is less than a threshold number of bits;
mix fourth audio data representing the ultrasonic signal with the portion of the third audio data to generate fifth audio data; and
cause the loudspeaker to output sound represented by the fifth audio data.

9. The computing device of claim 8, wherein:
the third audio data corresponds to sound that is associated with a first frequency range that is less than 20 kilo-hertz (kHz); and
the fourth audio data corresponds to the ultrasonic signal that is associated with a second frequency range that is greater than 20 kHz.

10. The computing device of claim 5, wherein:
the loudspeaker emits the ultrasonic signal for a period of time;
the first audio data represents the reflected signal for a first portion of the period of time; and
further comprising computer-executable instructions that, when executed, cause the one or more processors to:
generate, at least partly using the first microphone, third audio data representing the reflected signal for a second portion of the period of time, wherein at least part of the second portion of the period of time does not overlap with the first portion of the period of time;
determine, based at least in part on the third audio data, third feature data representing third frequency characteristics of the reflected signal detected at the first microphone; and
determine that the third frequency characteristics indicate that the reflected signal was reflected off the object that is in motion.

11. The computing device of claim 5, wherein:
the ultrasonic signal was emitted at a first frequency; and
determining, based at least in part on the first feature data, that the object is in motion comprises analyzing at least the first magnitude data to determine that a second frequency of the reflected signal is different than the first frequency.

12. The computing device of claim 5, further comprising computer-executable instructions that, when executed, cause the one or more processors to, prior to causing the loudspeaker to emit the ultrasonic signal:
generate, at least partly using at least one of the first microphone or the second microphone, third audio data representing noise in the environment;
determine third feature data representing third frequency characteristics of the noise; and removing a portion of feature data from the first feature data that corresponds to the third feature data.

13. A method comprising:
causing a loudspeaker of a computing device to emit an ultrasonic signal into an environment of the computing device;
receiving a reflected signal, corresponding to the ultrasonic signal, at a first microphone and a second microphone of the computing device, reflected signals originating at one or more objects in the environment;
generating, at least partly using the first microphone, first audio data representing the reflected signals;
generating, at least partly using the second microphone, second audio data representing the reflected signals;
determining, based at least in part on the first audio data, first feature data that represents first frequency characteristics of the reflected signals, the first feature data including first magnitude data and first phase data;
determining, based at least in part on the second audio data, second feature data that represents second frequency characteristics of the reflected signals, the second feature data including second magnitude data and second phase data;
determining, based at least in part on at least one of the first magnitude data or the second magnitude data, that a first reflected signal of the reflected signals originated at a first object, of the one or more objects, that is in motion; and
determining, based at least in part on the first phase data and the second phase data, a direction associated with the motion of the first object.

14. The method of claim 13, further comprising:
determining that a first signal-to-noise ratio (SNR) value for the first audio data is greater than a threshold SNR value; and
determining that a second SNR value for the second audio data is greater than the threshold SNR value; and
determining that the first object and a second object are in the environment based at least in part on the first SNR value and the second SNR value being greater than the threshold SNR value.

15. The method of claim 13, wherein the determining the direction associated with the motion of the first object comprises determining a difference between the first phase data and the second phase data.

16. The method of claim 13, wherein determining the first feature data that represents the first frequency characteristics of the reflected signals comprises:
decomposing the first audio data into magnitude data corresponding to a frequency of the reflected signals received at the first microphone; and
applying a logarithmic transform algorithm to the magnitude data.

17. The method of claim 13, further comprising:
analyzing third audio data stored in an audio buffer of the computing device;
identifying a portion of the third audio data with which to mix fourth audio data representing the ultrasonic signal; and
mixing the portion of the third audio data with the fourth audio data representing the ultrasonic signal to generate mixed audio data,
wherein causing the loudspeaker to emit the ultrasonic signal comprises causing the loudspeaker to output sound represented by the mixed audio data.

18. The method of claim 17, wherein:
- the third audio data corresponds to sound that is associated with a first frequency range that is less than 20 kilo-hertz (kHz); and
- the fourth audio data corresponds to the ultrasonic signal that is associated with a second frequency range that is greater than 20 kHz.

19. The computing device of claim 5, wherein determining the direction associated with the motion comprises:
- inputting the first phase data and the second phase data into a machine-learning (ML) model; and
- receiving, as output from the ML model, an indication of the direction associated with the motion.

20. The computing device of claim 5, wherein determining that the object is in motion comprises:
- inputting the first magnitude data into a machine-learning (ML) model; and
- receiving, as output from the ML model, an indication that the object is in motion.

* * * * *